(12) United States Patent
Srinivasamoorthy et al.

(10) Patent No.: US 9,690,557 B2
(45) Date of Patent: Jun. 27, 2017

(54) TECHNIQUES FOR RAPID DEPLOYMENT OF SERVICE ARTIFACTS

(71) Applicant: Oracle International Corporation, Redwood Shores, CA (US)

(72) Inventors: Arvind Srinivasamoorthy, Jamaica Plain, MA (US); Purushotham Kola, Secunderabad (IN); Ravindran Sankaran, Union City, CA (US); Annaji Garimella, Cupertino, CA (US); Raghavateja Kalapatapu, San Francisco, CA (US); Thirupathi Reddy Annadi, Sunnyvale, CA (US); Mark James Glenn Craig, Redwood City, CA (US); Nan Xie, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/970,516

(22) Filed: Aug. 19, 2013

(65) Prior Publication Data

US 2014/0040882 A1 Feb. 6, 2014

Related U.S. Application Data

(63) Continuation of application No. 12/769,016, filed on Apr. 28, 2010, now Pat. No. 8,527,985.
(Continued)

(51) Int. Cl.
*G06F 9/445* (2006.01)
*G06F 9/44* (2006.01)

(52) U.S. Cl.
CPC .............. *G06F 8/60* (2013.01); *G06F 8/10* (2013.01); *G06F 8/36* (2013.01)

(58) Field of Classification Search
CPC ...................................................... G06F 8/60
(Continued)

(56) References Cited

U.S. PATENT DOCUMENTS 5,699,518 A 12/1997 Held et al.
5,850,518 A 12/1998 Northrup
(Continued)

OTHER PUBLICATIONS

U.S. Appl. No. 12/768,990 , "Non-Final Office Action", Jun. 20, 2014, 14 pages.
(Continued)

*Primary Examiner* — Wei Zhen
*Assistant Examiner* — Lanny Ung
(74) *Attorney, Agent, or Firm* — Kilpatrick Townsend and Stockton LLP

(57) ABSTRACT

A framework (referred to herein as Application Integration Architecture, or AIA) that formalizes and orchestrates activities in an SOA development lifecycle. In one set of embodiments, AIA can capture development-related information in a shared data store and cause the information to flow in an automated or semi-automated manner from one lifecycle phase to the next as the lifecycle progresses. This information flow can, in turn, facilitate automations at each lifecycle phase for the responsible stakeholders (e.g., solution architects, developers, installation developers, etc.), thereby enforcing SOA best practices, enhancing development productivity, and ensuring the quality of the final SOA deliverables.

17 Claims, 34 Drawing Sheets

Related U.S. Application Data

(60) Provisional application No. 61/290,850, filed on Dec. 29, 2009.

(58) Field of Classification Search
USPC .......................................................... 717/177
See application file for complete search history.

(56) References Cited

U.S. PATENT DOCUMENTS

| | | | |
|---|---|---|---|
| 6,397,254 B1 | 5/2002 | Northrup | |
| 6,421,705 B1 | 7/2002 | Northrup | |
| 6,546,413 B1 | 4/2003 | Northrup | |
| 6,671,713 B2 | 12/2003 | Northrup | |
| 6,671,746 B1 | 12/2003 | Northrup | |
| 6,779,000 B1 | 8/2004 | Northrup | |
| 6,865,737 B1 | 3/2005 | Lucas et al. | |
| 6,922,705 B1 | 7/2005 | Northrup | |
| 7,062,749 B2 | 6/2006 | Cyr et al. | |
| 7,340,520 B1 | 3/2008 | Jordan et al. | |
| 7,430,590 B1 | 9/2008 | Rive et al. | |
| 7,512,942 B2 | 3/2009 | Brown et al. | |
| 7,526,764 B2 | 4/2009 | Fanshier | |
| 7,535,927 B1 | 5/2009 | Northrup | |
| 7,603,674 B2 | 10/2009 | Cyr et al. | |
| 7,607,126 B2 | 10/2009 | Read | |
| 7,676,806 B2 | 3/2010 | Curtis et al. | |
| 7,761,844 B2 * | 7/2010 | Bove ......................... | G06F 8/36 707/829 |
| 7,774,404 B2 | 8/2010 | Heidasch | |
| 7,840,669 B2 | 11/2010 | Dutta et al. | |
| 7,870,550 B1 | 1/2011 | Qureshi et al. | |
| 7,873,960 B2 | 1/2011 | Templin et al. | |
| 8,015,541 B1 | 9/2011 | Srinivasan et al. | |
| 8,140,582 B2 | 3/2012 | Chen et al. | |
| 8,234,561 B1 * | 7/2012 | Bourdev ............... | G06F 17/243 715/224 |
| 8,239,819 B2 | 8/2012 | Hafermann et al. | |
| 8,527,985 B2 | 9/2013 | Srinivasamoorthy et al. | |
| 8,584,119 B2 | 11/2013 | Ellington et al. | |
| 8,627,309 B2 | 1/2014 | Scheidel et al. | |
| 8,645,837 B2 | 2/2014 | Little | |
| 8,677,309 B2 | 3/2014 | Xie et al. | |
| 8,806,475 B2 | 8/2014 | Xie | |
| 9,395,965 B2 | 7/2016 | Garimella et al. | |
| 2002/0184610 A1 | 12/2002 | Chong et al. | |
| 2003/0172127 A1 | 9/2003 | Northrup | |
| 2004/0148370 A1 | 7/2004 | Sadiq | |
| 2005/0080801 A1 | 4/2005 | Kothandaraman et al. | |
| 2005/0086197 A1 | 4/2005 | Boubez et al. | |
| 2005/0204356 A1 | 9/2005 | Sundararajan et al. | |
| 2005/0262191 A1 | 11/2005 | Mamou et al. | |
| 2005/0289536 A1 | 12/2005 | Nayak et al. | |
| 2006/0029054 A1 * | 2/2006 | Breh et al. ................. | 370/385 |
| 2006/0031831 A1 | 2/2006 | Templin et al. | |
| 2006/0041643 A1 | 2/2006 | Fanshier | |
| 2006/0050862 A1 | 3/2006 | Shen et al. | |
| 2006/0095274 A1 | 5/2006 | Phillips et al. | |
| 2006/0150156 A1 | 7/2006 | Cyr et al. | |
| 2006/0253848 A1 * | 11/2006 | Mathieu et al. ............. | 717/168 |
| 2006/0265508 A1 | 11/2006 | Angel et al. | |
| 2007/0028208 A1 | 2/2007 | Maki | |
| 2007/0055972 A1 | 3/2007 | Brown et al. | |
| 2007/0074203 A1 | 3/2007 | Curtis et al. | |
| 2008/0005086 A1 | 1/2008 | Moore | |
| 2008/0065466 A1 | 3/2008 | Liu et al. | |
| 2008/0127047 A1 | 5/2008 | Zhang et al. | |
| 2008/0250386 A1 | 10/2008 | Erl | |
| 2008/0256507 A1 | 10/2008 | Chaar et al. | |
| 2008/0282219 A1 | 11/2008 | Seetharaman et al. | |
| 2009/0006147 A1 | 1/2009 | Padmanabhan | |
| 2009/0007088 A1 | 1/2009 | Fischer et al. | |
| 2009/0022151 A1 | 1/2009 | Jeon et al. | |
| 2009/0094577 A1 | 4/2009 | Fachat | |
| 2009/0144729 A1 | 6/2009 | Guizar | |
| 2009/0276769 A1 | 11/2009 | Brannen et al. | |
| 2009/0281996 A1 | 11/2009 | Liu et al. | |
| 2009/0285376 A1 | 11/2009 | Kremer-Davidson et al. | |
| 2009/0300192 A1 | 12/2009 | Northrup | |
| 2010/0017387 A1 | 1/2010 | Roshen | |
| 2010/0042986 A1 * | 2/2010 | Greiner et al. ............... | 717/174 |
| 2010/0095266 A1 | 4/2010 | Novak | |
| 2010/0125618 A1 | 5/2010 | Dutta et al. | |
| 2010/0217636 A1 | 8/2010 | Channabasavaiah et al. | |
| 2010/0228587 A1 | 9/2010 | Channabasavaiah et al. | |
| 2010/0306772 A1 | 12/2010 | Arnold et al. | |
| 2010/0312590 A1 | 12/2010 | Arunachalam et al. | |
| 2010/0318974 A1 | 12/2010 | Hrastnik et al. | |
| 2011/0041141 A1 | 2/2011 | Harm et al. | |
| 2011/0078654 A1 | 3/2011 | Thies et al. | |
| 2011/0161913 A1 | 6/2011 | Garimella et al. | |
| 2011/0161914 A1 | 6/2011 | Xie et al. | |
| 2011/0161915 A1 | 6/2011 | Srinivasamoorthy et al. | |
| 2011/0161921 A1 | 6/2011 | Garimella et al. | |
| 2011/0276961 A1 | 11/2011 | Johansson et al. | |
| 2012/0066674 A1 | 3/2012 | Xie | |
| 2012/0167072 A1 | 6/2012 | Boykin et al. | |

OTHER PUBLICATIONS

U.S. Appl. No. 12/881,028, "Notice of Allowance", Apr. 25, 2014, 8 pages.
Schmidt, "Model-Driven Engineering", IEEE Computer, vol. 39, No. 2 Retrieved from the Internet: URL<http://dl.acm.org/citation.cfm?id=1115706>, Feb. 2006, pp. 25-31.
U.S. Appl. No. 12/768,999, "Final Office Action", Jul. 24, 2014, 18 pages.
Adcock et al., "ANSAware and DCE—A Comparison" May 1994, 1-64 pages.
Li, "An overview of real time ANSAware 1.0," Distribution System Engineering 2, Copyright 1995, pp. 28-38, The British Computer Society, UK.
Non-Final Office Action for U.S. Appl. No. 12/881,028 mailed on Oct. 1, 2012, 9 pages.
Non-Final Office Action for U.S. Appl. No. 12/769,016 mailed on Nov. 23, 2012, 11 pages.
Non-Final Office Action for U.S. Appl. No. 12/769,006 mailed on Dec. 7, 2012, 13 pages.
Non-Final Office Action for U.S. Appl. No. 12/768,990 mailed on Feb. 28, 2013, 11 pages.
Non-Final Office Action for U.S. Appl. No. 12/768,999 mailed on Mar. 15, 2013, 13 pages.
Final Office Action for U.S. Appl. No. 12/769, 006 mailed on May 8, 2013, 17 pages.
Notice of Allowance for U.S. Appl. No. 12/769,016 mailed on May 8, 2013, 9 pages.
Non-Final Office Action for U.S. Appl. No. 12/881,028 mailed on May 21, 2013, 9 pages.
Advisory Action for U.S. Appl. No. 12/769,006 mailed on Jul. 1, 2013, 3 pages.
Non-Final Office Action for U.S. Appl. No. 12/769,006 mailed on Aug. 1, 2013, 20 pages.
Final Office Action for U.S. Appl. No. 12/768,999 mailed on Aug. 9, 2013, 13 pages.
Final Office Action for U.S. Appl. No. 12/768,990 mailed on Oct. 2, 2013, 12 pages.
Final Office Action for U.S. Appl. No. 12/769,006 mailed on Oct. 10, 2013, 21 pages.
Cox et al., "Management of the Service-Oriented-Architecture Life Cycle", IBM Systems Journal, col. 44, No. 4, 2005 18 pages.
Laliwala et al., "Event-Driven Service-Oriented Architecture", IEEE, 2008, 6 pages.
Non-Final Office Action for U.S. Appl. No. 12/768,999 mailed on Dec. 11, 2013, 14 pages.
Final Office Action for U.S. Appl. No. 12/881,028 mailed on Jan. 14, 2014, 12 pages.
Notice of Allowance for U.S. Appl. No. 12/769,006 mailed on Jan. 16, 2014, 8 pages.
U.S. Appl. No. 12/768,990, "Final Office Action", mailed Jan. 7, 2015, 15 pages.

(56) References Cited

OTHER PUBLICATIONS

U.S. Appl. No. 12/768,999, "Non Final Office Action", mailed Nov. 14, 2014, 17 pages.
U.S. Appl. No. 12/768,990, "Non-Final Office Action", mailed Sep. 23, 2015, 28 pages.
U.S. Appl. No. 12/768,999, "Final Office Action", mailed May 12, 2015, 19 pages.
U.S. Appl. No. 12/768,999, "Non-Final Office Action", mailed Aug. 28, 2015, 19 pages.
U.S. Appl. No. 12/768,990, "Final Office Action", Mar. 24, 2016, 17 pages.
U.S. Appl. No. 12/768,999, "Notice of Allowance", Mar. 23, 2016, 11 pages.
U.S. Appl. No. 12/768,990, Advisory Action mailed Sep. 26, 2016, 4 pages.
U.S. Appl. No. 12/768,990, "Non Final Office Action", Mar. 6, 2017, 17 pages.

\* cited by examiner

FIG. 4

ORACLE® AIA Project Lifecycle Workbench      Logged In As weblogic   Logout
Home Project > Add Project Add Project

* Name: Order to Asset Integration    Type: PIP
* Project Code: Order2Asset    Status: Planned / Roadmap
Implementation Vendor: Vendor Name    Version: 1.0
Industry: Core

- Description
- Assumption
- Business Tasks
- Document Links

Font [ B / U | S₂ s² S | 📋 2 ⤶ ⤷ ∞ | 📇 ⊡ A | ▽ 田 □ ▽ | ≡ ≡ ≡ | ⋮≡ ⋮≡ | ⋲ ⋺ | ⟋ ⊗ ]

Assumptions and Constraints

The following is a list of design assumptions:

1. All lines within a service bundle reference products from the same billing system.
   Based on this assumption, it follows that a single CRM asset can be mapped to a service instance or a purchased product/discount instance in ONLY one billing system.
   This assumption is documented.
2. Source system for orders and installed assets is the same.
   This assumption is documented.
3. Asset creation is triggered after the order lines are fulfilled or completed (provisioned and billed).
   This assumption is documented.
4. Ordered quantity on line is 1.

[Cancel]

[Save and Return] [Save]

Copyright © 2009, Oracle and/or its affiliates. All rights reserved.

```xml
<DeploymentPlan component="FP" version="3.0">
 <PreConfiguration>
  <!-- Add custom content -->
 </PreConfiguration>
 <Configurations>
  <Datasource name="fodDS" jndiLocation="jdbc/fodDS" action="create" resourcetargetidentifier="fod" wiserver="fp"/>
  <Datasource name="SOADemo" jndiLocation="jdbc/SOADemo" action="create" resourcetargetidentifier="fod" wiserver="fp"/>
  <UpdateMetadata wiserver="fp">
   <fileset dir="$(AIA_HOME)/AIAMetaData">
    <include name="AIAComponents/ApplicationObjectLibrary/AIADemo/**"/>
   </fileset>
  </UpdateMetadata>
  <DbAdapter connection-instance-jndi="eis/DB/fodDS" datasource-jndi="jdbc/fodDS" action="create" wiserver="fp"/>
  <DbAdapter connection-instance-jndi="eis/DB/SOADemo" datasource-jndi="jdbc/SOADemo" action="create" wiserver="fp"/>
  <JMSResource jmsResourceType="ConnectionFactory" jmsResourceName="jms/aia/AIADemoBatchQueueCF" jmsresou
jmsModuleName="AIAJMSModule" jmsSubDeploymentName="AIASubDeployment" action="create" wiserver="fp" />
  <JMSAdapter connection-instance-jndi="eis/aia/AIADemoBatch" connection-fac-Location="jms/aia/jms/AIADem
wiserver="fp" />
 </Configurations>
 <PostConfiguration>
  <!-- Add custom content -->
 </PostConfiguration>
 <PreDeployment>
  <!-- Add custom content -->
 </PreDeployment>
 <Deployments>
  <Composite compositeName="AIADemoProcessSalesOrderCBP" compositedir="/slot/ems3470/oracle/AIAHOME_102
revision="1.0" wiserver="fp" action="deploy" />
  <Composite compositeName="AIADemoSyncCustomerPartyReqDBAdpater"
compositedir="/slot/ems3470/oracle/AIAHOME_1023/samples/AIADemo/Adapters/AIADemoSyncCustomerPa
  <Composite compositeName="AIADemoSyncCustomerPartyListCRMProvDBAdapter"
compositedir="/slot/ems3470/oracle/AIAHOME_1023/samples/AIADemo/Adapters/AIADemoSyncCustomerPa
action="deploy" />
  <Composite compositeName="AIADemoCreateShipmentRequestBatchProvABCSImpl"
compositedir="/slot/ems3470/oracle/AIAHOME_1023/samples/AIADemo/ProviderABCS/AIADemoCreateShipn
action="deploy" />
 </Deployments>
 <PostDeployment>
  <!-- Add custom content -->
 </PostDeployment>
</DeploymentPlan>
```

*FIG. 32*

```xml
<?xml version="1.0" encoding="UTF-8" ?>
<properties>
+ <aiainstance>
  <ver>
- <fp>
    <version>3.0.0.0</version>
  - <server>
      <adminhostname>sdc68021crm.us.oracle.com</adminhostname>
      <adminport>7071</adminport>
      <domainname>soa_domain</domainname>
      <username>weblogic</username>
      <password>[C@568c24</password>
      <servertype>Server</servertype>
      <soaserver>soa_server1</soaserver>
      <!-- In case of cluster the below would be the Proxy URL and proxy Port -->
      <saoserverhostname>sdc68021crm.us.oracle.com</soaserverhostname>
      <saoserverport>8071</soaserverport>
    </server>
  - <db>
    - <aia>
        <jdbc-url>jdbc:oracle:thin:@sdc68021crm.us.oracle.com:1591:ovm21crm</jdbc-url>
        <username>AIA1023_AIA</username>
        <password>[C@957096</password>
        <createschema>true</createschema>
        <sysusername>sys</sysusername>
        <syspassword>[C@112905b</syspassword>
        <role>SYSDBA</role>
        <defaulttablespace>SYSTEM</defaulttablespace>
        <temptablespace>TEMP</temptablespace>
      </aia>
    + <mds>
    + <jms>
    + <xref>
    + <aialifecycle>
    </db>
</fp>
```

FIG. 33

TECHNIQUES FOR RAPID DEPLOYMENT OF SERVICE ARTIFACTS

CROSS-REFERENCES TO RELATED APPLICATIONS

This application is a continuation of U.S. Pat. No. 8,527,985, filed on Apr. 28, 2010, entitled "Techniques for Rapid Deployment of Service Artifacts," and claims the benefit and priority under 35 U.S.C. 119(e) of U.S. Provisional Application No. 61/290,850, filed Dec. 29, 2009, entitled "Support for End-to-End SOA Project Development Lifecycle," the entire contents of each are incorporated herein by reference in their entirety for all purposes.

The present application also incorporates by reference for all purposes the entire contents of the following commonly-assigned applications, which were filed concurrently with the parent application filed on Apr. 28, 2010 entitled "Techniques for Rapid Deployment of Service Artifacts":

U.S. Non-Provisional Application No. 12/768,990, filed Apr. 28, 2010, and now published as US 2011/0161913, entitled "TECHNIQUES FOR MANAGING FUNCTIONAL SERVICE DEFINITIONS IN AN SOA DEVELOPMENT LIFECYCLE";

U.S. Non-Provisional Application 12/768,999, filed Apr. 28, 2010, now issued as U.S. Pat. No. 9,395,965, entitled "TECHNIQUES FOR AUTOMATED GENERATION OF SERVICE ARTIFACTS"; and U.S. Non-Provisional Application 12/769,066, filed Apr. 28, 2010, now issued as U.S. Pat. No. 8,677,309, entitled "TECHNIQUES FOR AUTOMATED GENERATION OF DEPLOYMENT PLANS IN AN SOA DEVELOPMENT LIFECYCLE".

BACKGROUND

Embodiments of the present disclosure relate generally to software development, and in particular to techniques for facilitating the development of Service Oriented Architecture (SOA) applications.

Software development can be a highly complex and interactive process. In many cases, it involves stakeholders from different organizations and with different perspectives (e.g., solution architects, developers, installation developers, etc.) who must cooperate over an extended period of time to deliver a polished software product.

With the rise in popularity of Service Oriented Architecture (SOA), the challenges of software development have increased rather than lessened. Generally speaking, SOA is a software design paradigm that encapsulates application functionality into loosely-coupled, reusable components, known as services. While SOA provides a number of benefits over more tightly-coupled software architectures, the SOA principles of service reusability, service autonomy, and service composability add additional layers of complexity to the software development lifecycle.

Accordingly, it would desirable to have techniques that facilitate the development of SOA applications.

BRIEF SUMMARY

Embodiments of the present disclosure provide a framework (referred to herein as Application Integration Architecture, or AIA) that formalizes and orchestrates activities in an SOA development lifecycle. In one set of embodiments, AIA can capture development-related information in a shared data store and cause the information to flow in an automated or semi-automated manner from one lifecycle phase to the next as the lifecycle progresses. This information flow can, in turn, facilitate automations at each lifecycle phase for the responsible stakeholders (e.g., solution architects, developers, installation developers, etc.), thereby enforcing SOA best practices, enhancing development productivity, and ensuring the quality of the final SOA deliverables.

For example, during a first lifecycle phase (e.g., a functional definition phase), ATA can facilitate the definition and decomposition of an SOA application into functional components and persist the functional components in a shared data store.

During a second lifecycle phase (e.g., a service construction phase), AIA can retrieve the functional component definitions persisted in the first lifecycle phase and use the retrieved definitions to automatically generate service artifacts, AIA can also harvest metadata pertaining to the implemented service artifacts and associate the metadata with the functional component definitions in the shared data store.

During a third lifecycle phase (e.g., a deployment plan generation phase), ATA can retrieve the functional component definitions persisted in the first lifecycle phase and the metadata harvested in the second lifecycle phase and used the retrieved definitions and metadata to automatically generate one or more deployment plans.

And during a fourth lifecycle phase (e.g., a deploy phase), AIA can automatically deploy the SOA application artifacts based on the deployment plan generated in the third lifecycle phase.

According to one embodiment of the present disclosure, a deployment plan is retrieved by a computer system that specifies one or more software services to be deployed as part of an SOA application, and a deployment properties file is retrieved by the computer system that specifies one or more target servers for deploying the one or more software services. The SOA application is then automatically deployed based on the deployment plan and the deployment properties file.

In one embodiment, the deployment plan is generated by storing a functional representation of the SOA application in a shared data store, the functional representation including a set of business tasks; collecting metadata pertaining to a software service that fulfills a business task in the set of business tasks; and generating the deployment plan based on the functional definition and the metadata.

In one embodiment, the storing, collecting, generating, and automatically deploying are performed during different lifecycle phases of the SOA application.

In one embodiment, one or more customizations to the deployment plan are received from a user, and the deployment plan is modified based on the one or more customizations prior to automatically deploying the SOA application.

In one embodiment, the deployment plan is expressed in Extensible Markup Language (XML) and the one or more customizations include one or more custom XML tags.

In one embodiment, the one or more customizations include one or more pre-deployment or post-deployment actions.

In one embodiment, the deployment plan further specifies one or more artifacts associated with the one or more software services.

In one embodiment, the deployment plan further specifies one or more configurations associated with the one or more software services.

In one embodiment, the one or more target servers include a target application server and a target database server.

A further understanding of the nature and advantages of the embodiments disclosed herein can be realized by reference to the remaining portions of the specification and the attached drawings.

BRIEF DESCRIPTION OF THE DRAWINGS

FIGS. 4-10 are screenshots of user interfaces for carrying out the process of FIG. 3 in accordance with an embodiment of the present disclosure.

Figure 18:
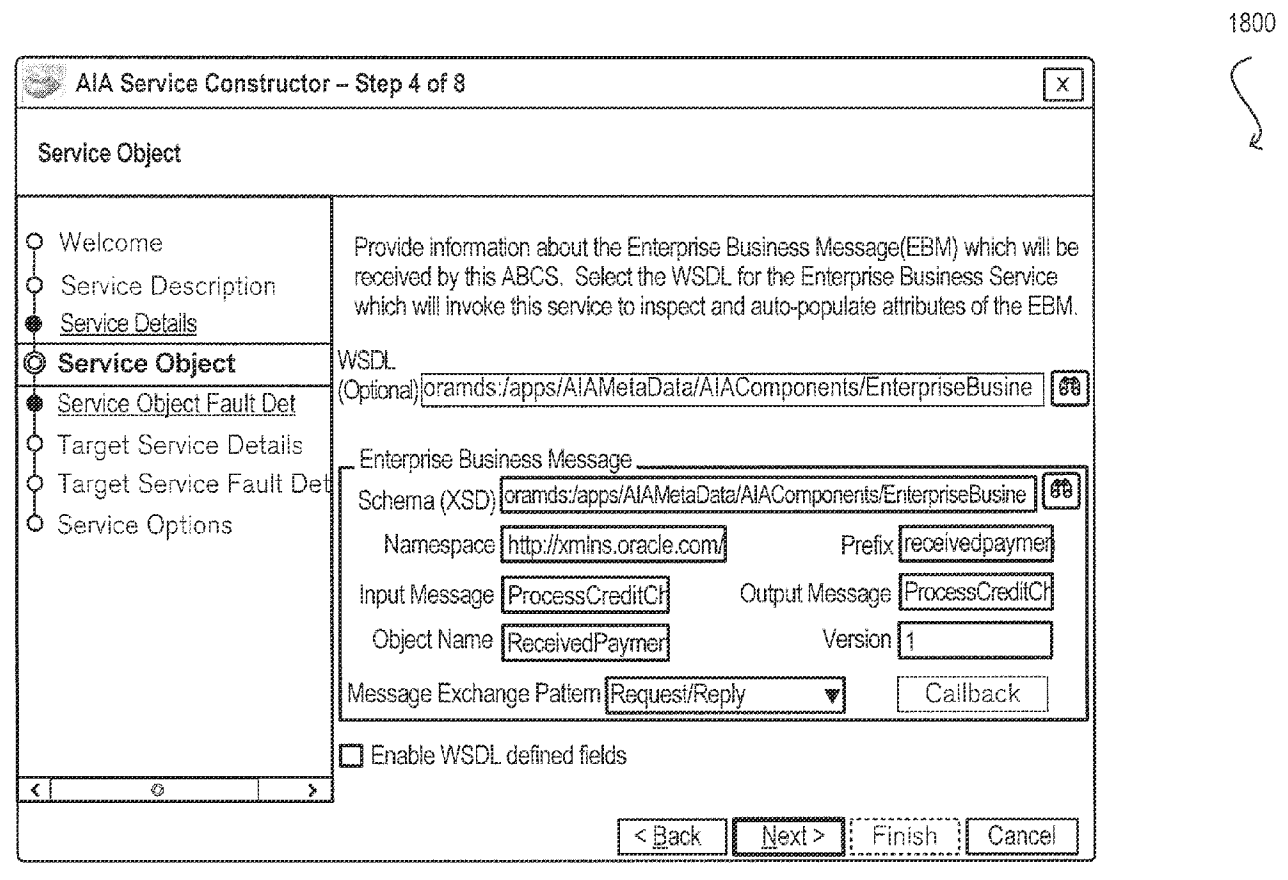
Figure 19:
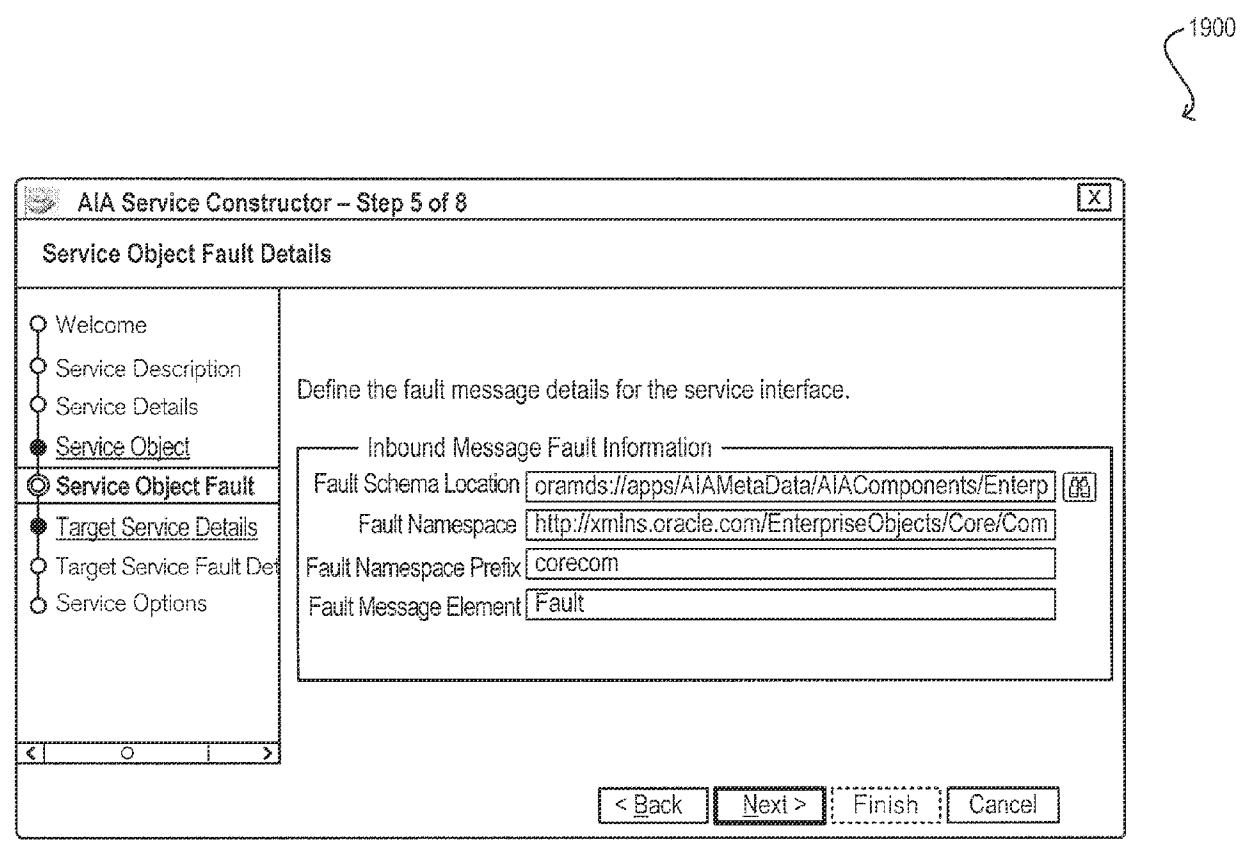
Figure 20:
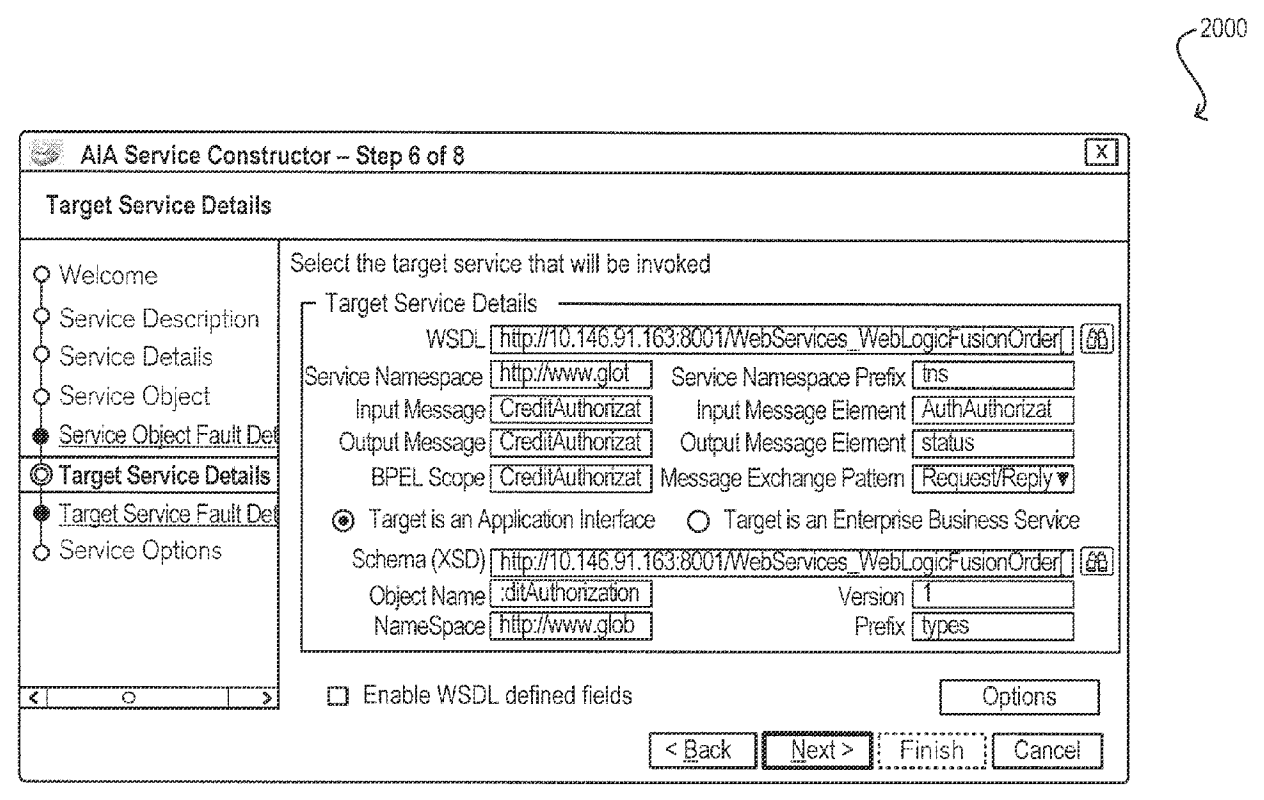
Figure 21:
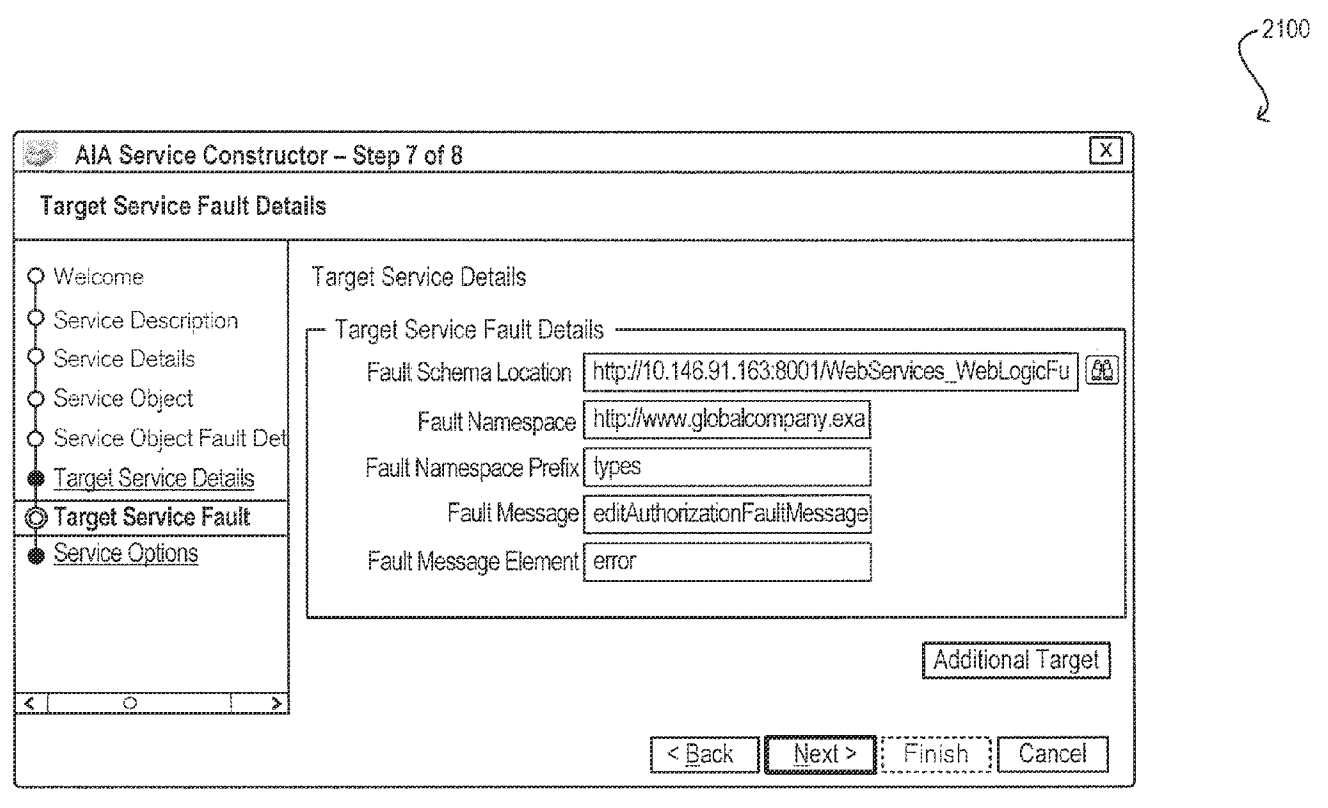
Figure 22:
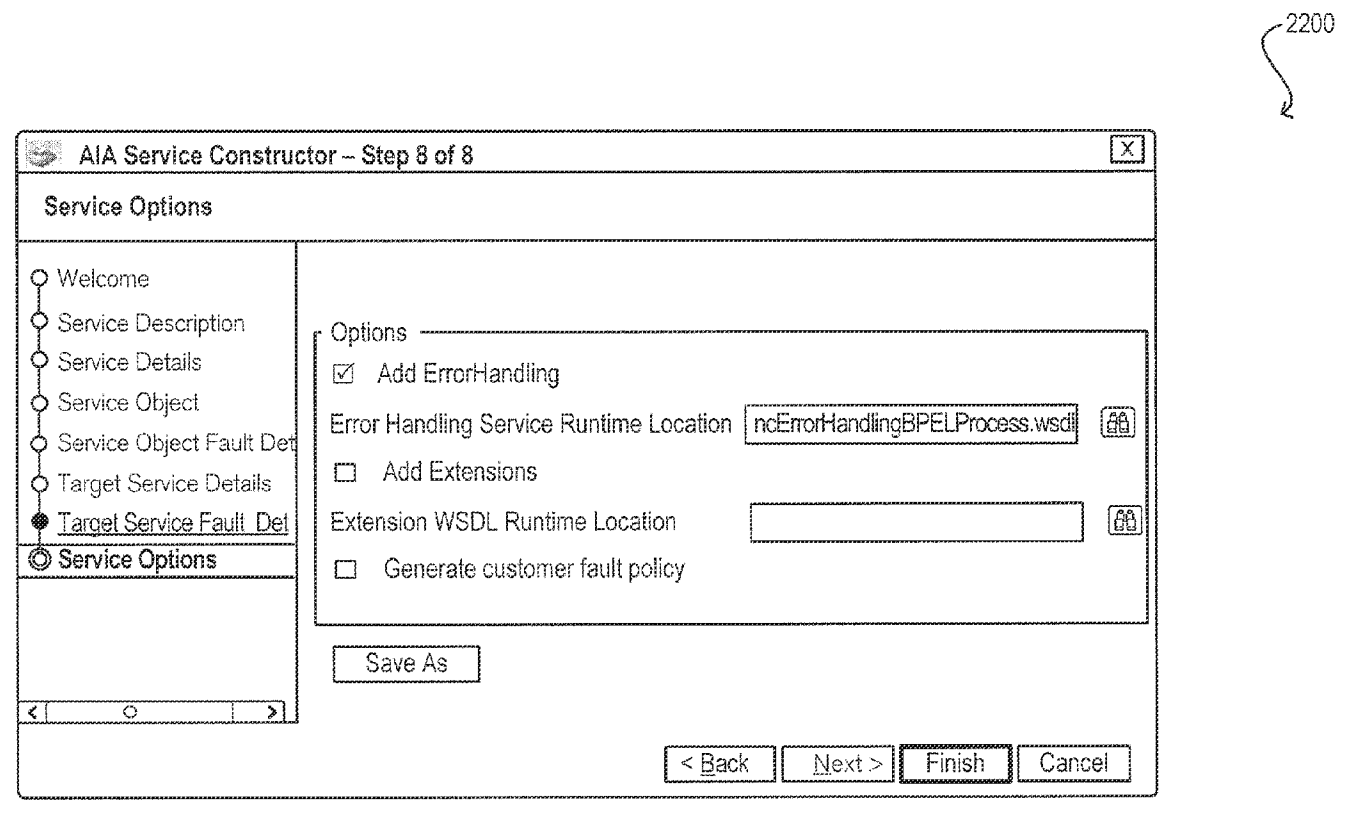

FIGS. 15-23 are screenshots of user interfaces for carrying out the process of FIG. 14 in accordance with an embodiment of the present disclosure.

FIGS. 26-28 are screenshots of user interfaces for carrying out the process of FIG. 25 in accordance with an embodiment of the present disclosure.

FIG. 32 illustrates an example deployment plan in accordance with an embodiment of the present disclosure.

FIG. 33 illustrates an example deployment properties file in accordance with an embodiment of the present disclosure.

DETAILED DESCRIPTION

In the following description, for the purposes of explanation, numerous details are set forth in order to provide an understanding of embodiments of the present disclosure. Ti will be apparent, however, to one of ordinary skill in the art that certain embodiments can be practiced without some of these details.

Figure 1:
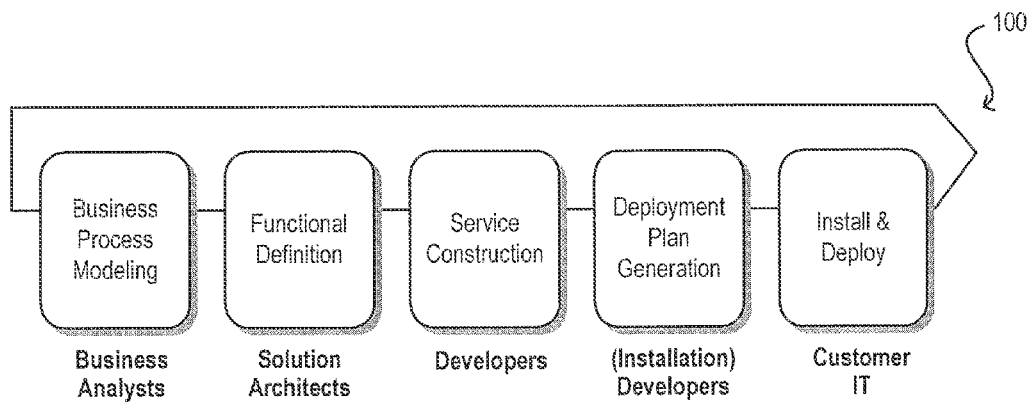
FIG. 1 is a simplified block diagram illustrating an example SOA development lifecycle.

FIG. 1 is a simplified block diagram 100 that illustrates a development lifecycle for an enterprise-class SOA application. Diagram 100 is presented to provide an overview of the activities that are typically carried out in such a lifecycle, as well as the information flows that are typically required between lifecycle phases.

In the first phase ("Business Process Modeling"), a first set of individuals (e.g., business analysts) translate a business process into a model that conveys how business objectives can be carried out in an abstract and application-independent manner.

In the second phase ("Functional Definition"), a second set of individuals (e.g., solution architects) decompose the business process model into a set of business tasks, and further decompose each business task into one or more functional components (referred to herein as service solution components). Each service solution component is a functional representation of a software service that is designed to fulfill its corresponding business task. As part of this process, it is generally desirable for the solution architects to determine whether the functionality of a particular service solution component can be fulfilled by an existing service in the enterprise's SOA portfolio, thereby promoting service reuse.

In the third phase ("Service Construction"), a third set of individuals (e.g., developers) implement software services that correspond to the service solution components defined in the second phase. With existing development methodologies, this generally requires the solution architects to engage with the developers (e.g., via functional design documents, meetings, e-mail, etc.) to communicate the details of the service solution component definitions. This may also require developers to communicate with each other to ensure that all developers are following recommended coding practices.

In the fourth phase ("Deployment Plan Generation"), a fourth set of individuals (e.g., installation developers and/or release management/IT operations) identify the services that collectively fulfill the business process defined in the first and second phases. This collection of services represents the SOA project or application that is ultimately delivered to customers. With existing development methodologies, this generally requires the installation developers to interact with the solution architects and developers to determine which services are to be included in the application, as well as the deployment information for each service (e.g., adapters, queues, schemas, JNDI resources, etc.) and the relationships/dependencies between service artifacts.

In the fifth phase ("Deploy") fifth set of individuals customer IT) deploy the packaged SOA application at a customer site. With existing methodologies, this generally requires customer IT to create and execute one or more deployment scripts. When the content to be deployed changes over time or the topology on which the deployment occurs changes, customer IT must generally coordinate with development teams to understand the relationship between the artifacts being deployed and how they should be configured for a specific topology. Customer IT must then recreate or modify the deployment scripts accordingly.

As can be seen, the SOA development lifecycle is a complex process that requires significant amount of collaboration and information sharing between the stakeholders involved at each lifecycle phase. For example, information regarding service solution components needs to be passed from solution architects in the second phase to developers in the third phase, information regarding implemented services and associated deployment information needs to be passed from developers in the third phase to installation developers in the fourth phase, and so on.

Embodiments of the present disclosure provide a framework (referred to herein as Application Integration Architecture, or AIA) that facilitates information flow between the foregoing lifecycle phases by formalizing and orchestrating the SOA development lifecycle. In particular, AIA can capture development-related information in a shared data store and cause the information to flow in an automated or semi-automated manner from one lifecycle phase to the next as the lifecycle progresses. This information flow can, in turn, enable automations at each lifecycle phase for the responsible stakeholders (e.g., solution architects, developers, installation developers, etc.), thereby enforcing SOA best practices, enhancing development productivity, and ensuring the quality of the final SOA deliverables.

Figure 2:
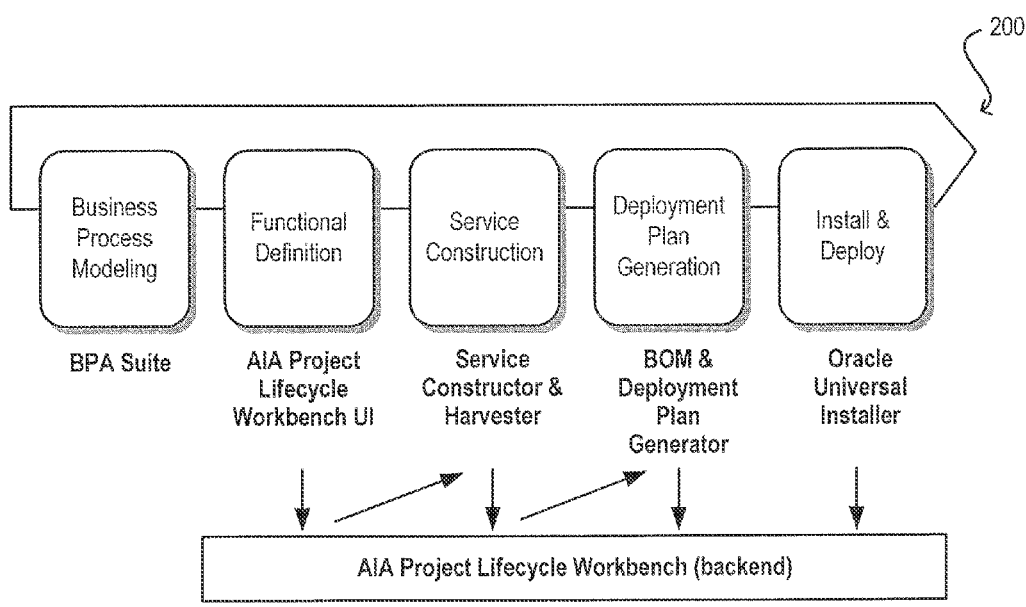
FIG. 2 is a simplified block diagram illustrating the SOA development lifecycle of FIG. 1 as enhanced by AIA in accordance with an embodiment of the present disclosure.

AIA can Include, Inter Alia:

Project lifecycle Workbench to, e.g., facilitate the definition and decomposition of an SOA application into service solution components and persist the service solution components in a shared data store;

Service Constructor to, e.g., retrieve the service solution components stored in the shared data store and use the retrieved definitions to automatically generate artifacts for services;

Harvester to, e.g., harvest tnetadata pertaining to the implemented service artifacts and associate the metadata with the service solution components in the shared data store;

Deployment Plan Generator to, e.g., retrieve the service solution component definitions and harvested metadata of the implemented services from the shared data store and use the retrieved definitions and metadata to automatically generate a deployment plan; and Installation Driver to, e.g., automatically deploy the SOA application based on the generated deployment plan against any server and any desired topology, FIG. 2 is a simplified block diagram 200 that illustrates, for a particular embodiment, how the foregoing AIA components interact and when they may be used during the course of an SOA development lifecycle. The following sections describe each of these components in further detail.

Project Lifecycle Workbench

Project Lifecycle Workbench (PLW) is a software application that can be implemented as a Web-based application, proprietary client-server application, or the like. In various embodiments, PLW can provide a centralized user interface for managing SOA development lifecycle activities in a streamlined manner.

As discussed above with respect to FIG. 1, in the Functional Definition lifecycle phase, solution architects build upon the modeling work of business analysts and define a business process in terms of business tasks and constituent service solution components. A service solution component is the mechanism via which a solution architect conveys to his/her development stakeholders that a service is needed to fulfill a desired business functionality. In the prior art, this information was typically conveyed to development in the form of functional design documents drafted by the solution architects.

In embodiments of the present disclosure, PLW can enable a solution architect to enter business tasks and functional requirements for constituent service solution components directly into the AIA system. In this manner, all of the functional definitions can be captured and persisted in a shared data store (e.g., the PLW backend shown in FIG. 2), and can automatically flow downstream to other lifecycle phases (e.g., the Service Construction lifecycle phase and the Deployment Plan Generation lifecycle phase). In certain embodiments, these functional definitions can also be automatically populated in the PLW backend from another process or application, as a business process modeling application.

Figure 3:
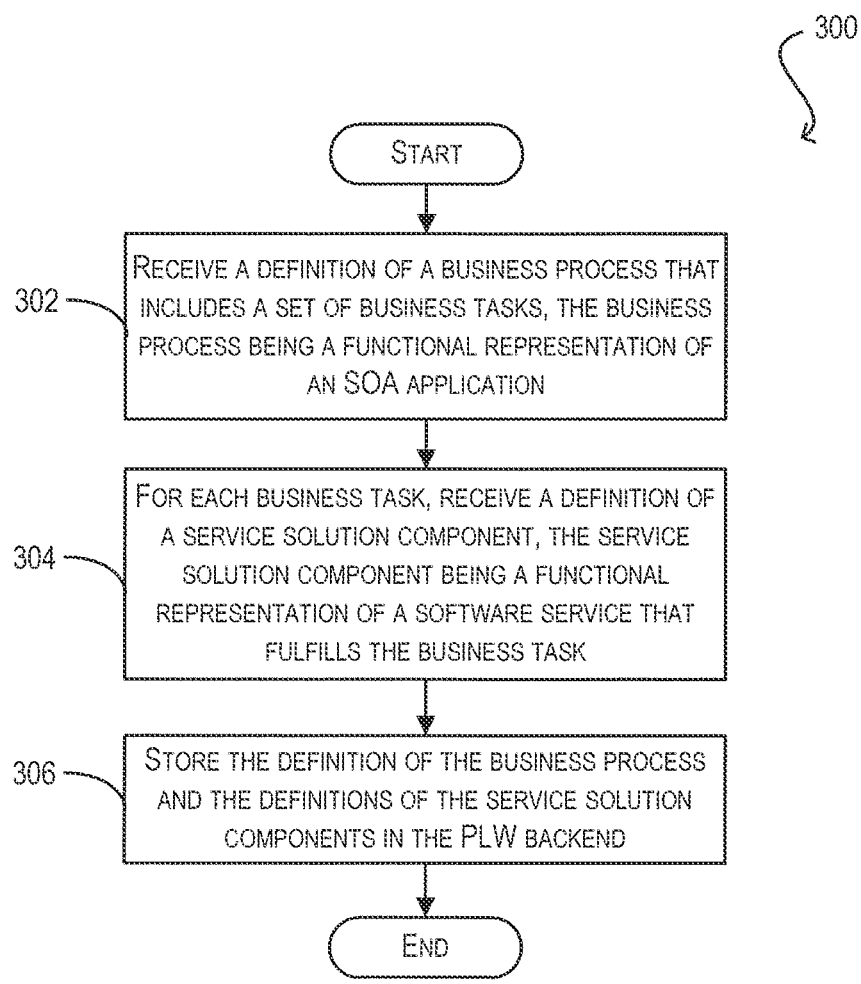
FIG. 3 is a flow diagram illustrating a process for capturing a functional representation of an SOA application (e.g., a business process definition including business tasks and service solution components) in accordance with an embodiment of the present disclosure.

FIG. 3 is flow diagram of a process 300 for capturing a functional representation of an SOA application (e.g., a business process definition including business tasks and service solution components) via PLW according to an embodiment of the present disclosure. In various embodiments, process 300 can be carried out during the Functional Definition lifecycle phase of the application. Portions of process 300 can be implemented in software, hardware, or a combination thereof. As software, process 300 can be encoded as program code stored on a computer-readable storage medium.

Figure 4:
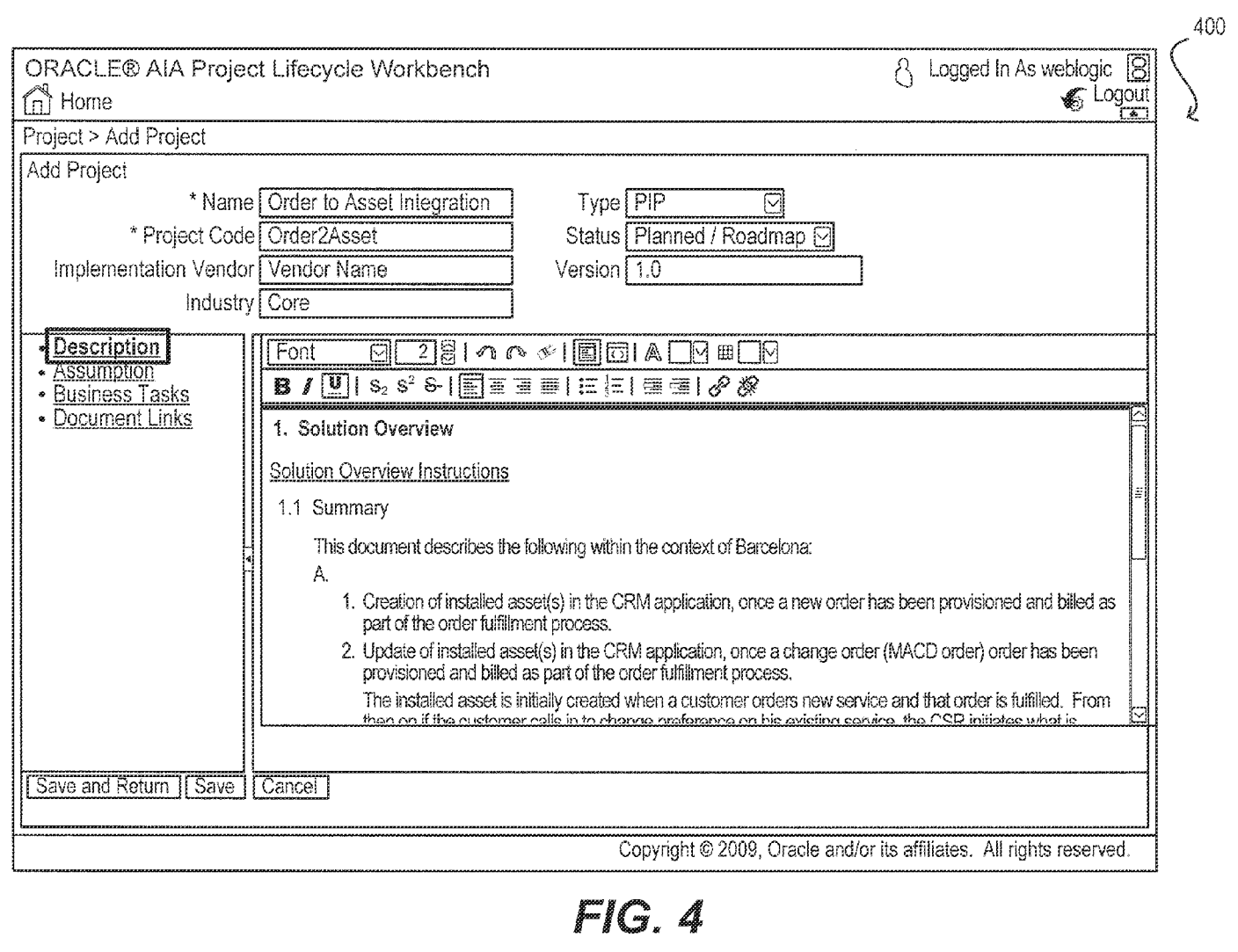
Figure 7:

At block 302, PLW can receive a definition of a business process, where the business process is a functional representation of an SOA application. The business process definition can include attributes such as name, type, project code, status, implementation vendor, version, and industry. In addition, the process definition can include a description attribute that provides an overview of the process, an assumptions attribute that describes various design assumptions and constraints, and one or more documents links that link to associated documents (e.g., functional design documents). FIGS. 4, 5, and 7 illustrate example PLW user interfaces 400, 500, and 700 that can be generated to facilitate entry of this information.

Figure 6:
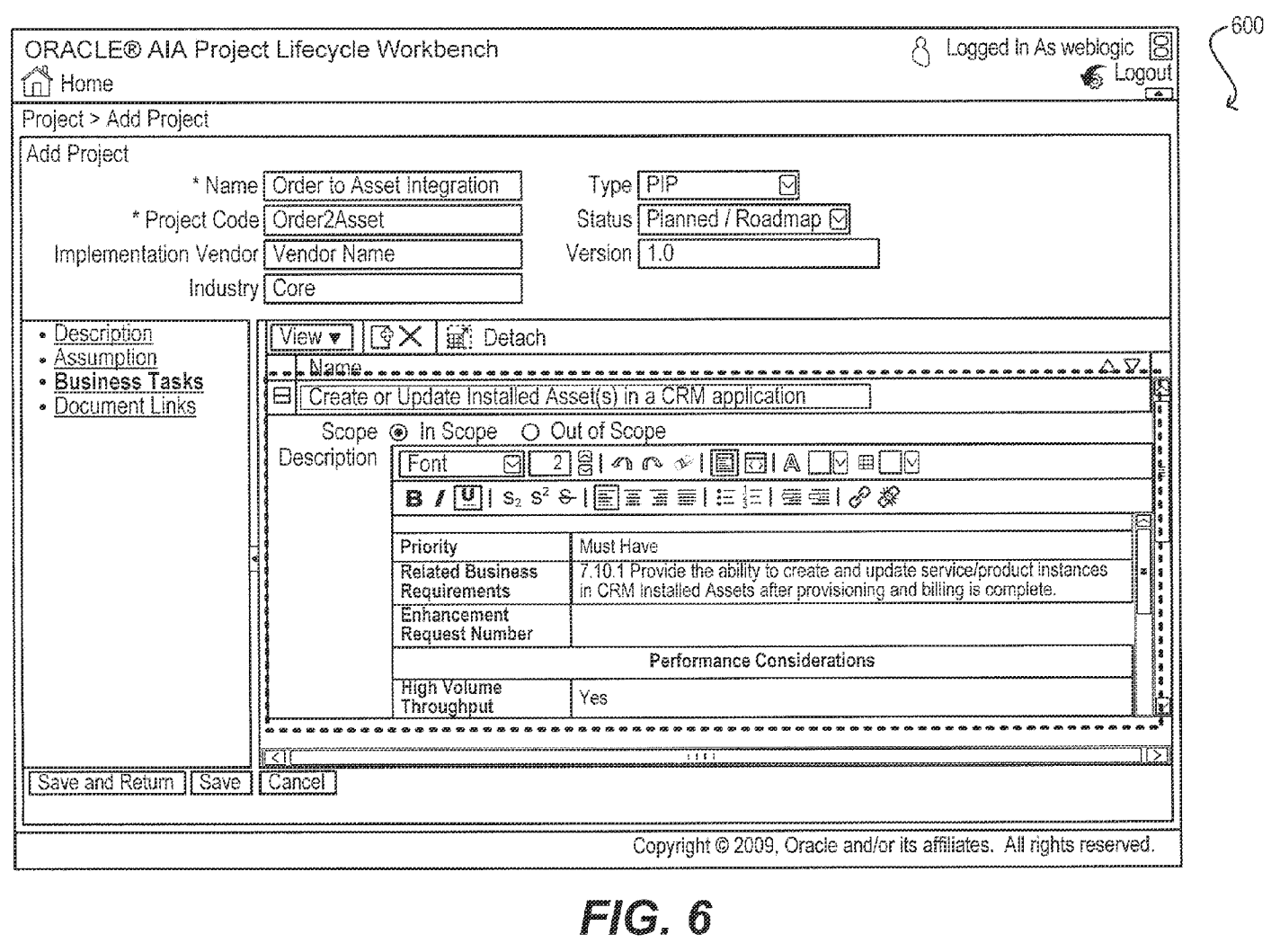

In one set of embodiments, the business process definition received at block 302 of FIG. 3 can also include a set of business tasks (and groupings of tasks known as business activities). These business tasks specify business logic that, taken together, address the business requirements of the overall business process. In certain embodiments, each business task will eventually be fulfilled by one or more executable services. FIG. 6 illustrates an example PLW user interface 600 for adding business tasks to a process.

Figure 8:
Figure 9:
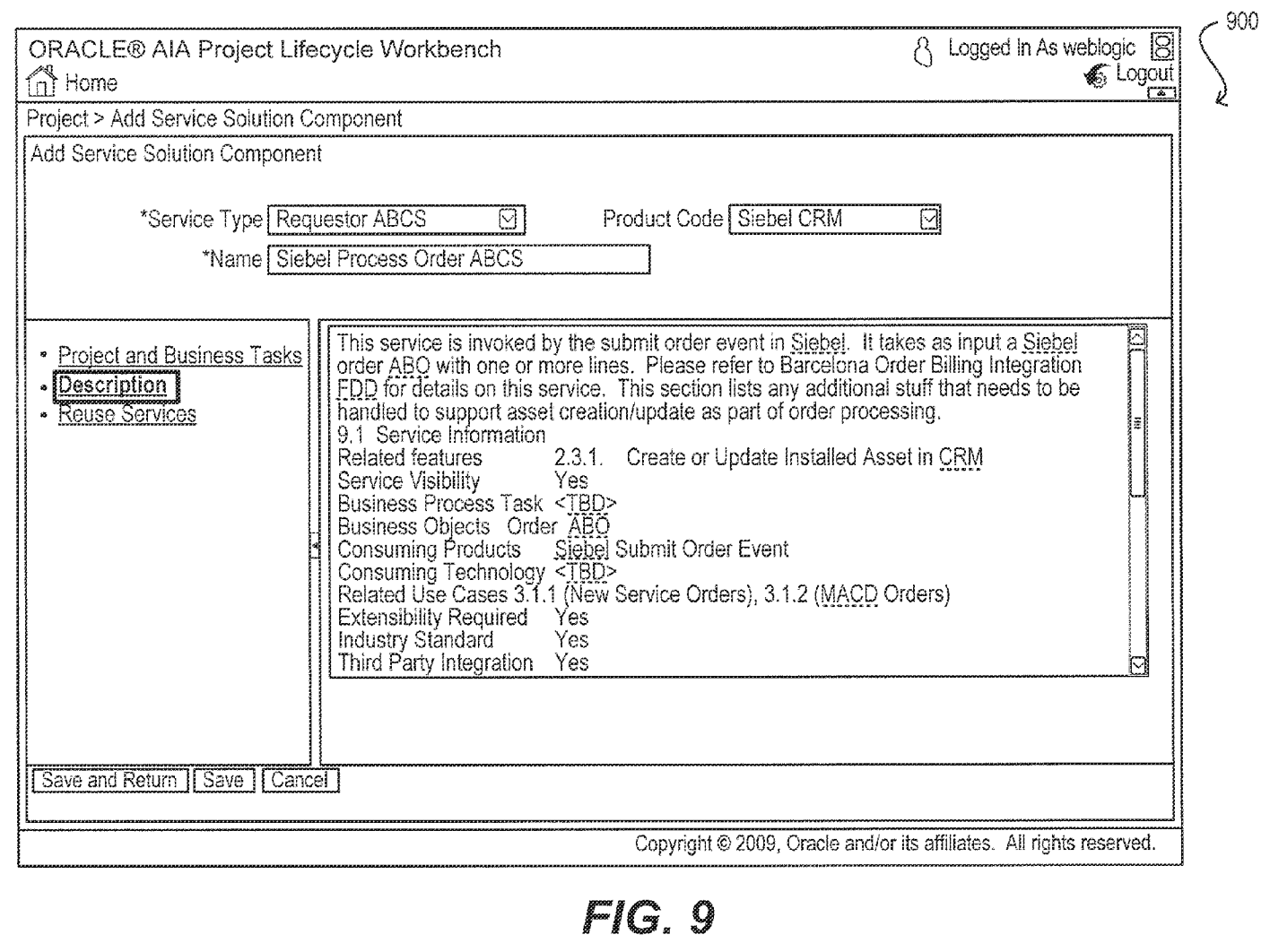

Once a business process definition (including constituent business tasks) is received, PLW can receive, for each business task, a definition of a service solution component (block 304 of FIG. 3). As described above, a service solution component is a functional representation of a software service that fulfills its corresponding business task. FIG. 8 illustrates an example PLW user interface 800 for adding a new service solution component to the task "Create or Update Installed Asset(s) in a CRM Application," and FIG. 9 illustrates an example PLW user interface 900 for editing the attributes of the service solution component. As shown in RIG. 9, these attributes can include name, service type, and product code. In addition, a user (e.g., solution architect) can enter a free-text description of the desired functionality of the service to be implemented via the "Description" link, and can associate an existing service with the service solution component via the "Reuse Services"link. The notion of searching for and reusing existing services is described in further detail with respect to FIGS. 11 and 12 below.

Figure 10:
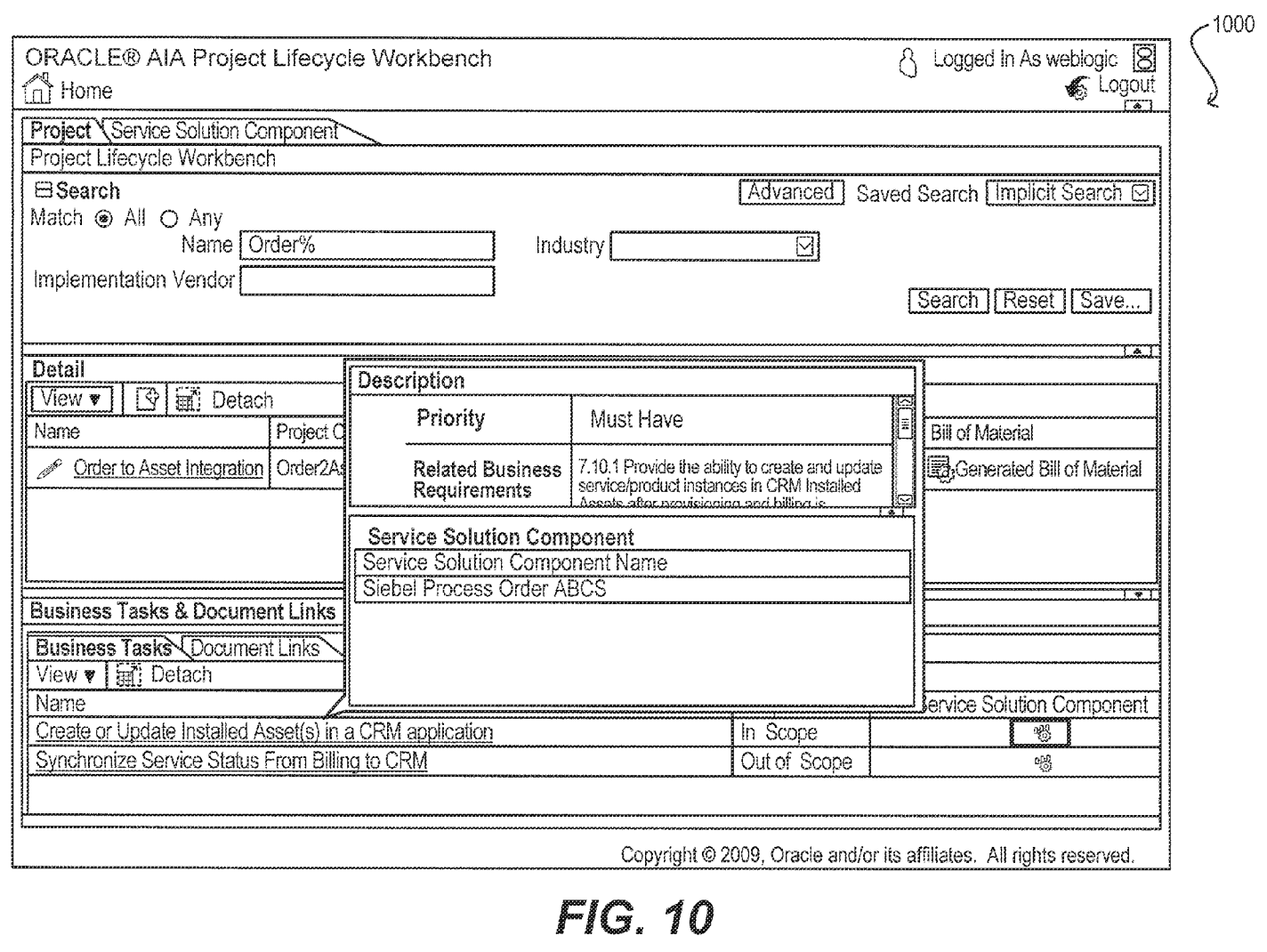

At block 306 of FIG. 3, the business process definition and constituent service solution component definitions can be stored in a shared data store in the PLW backend. FIG. 10 illustrates an example PLW user interface 1000 that shows the service solution component "Siebel Process Order ABCS" defined in FIG. 9 as being associated with the "Create or Update Installed Asset(s) in a CRM Application" task. By persisting the business process and service solution component definitions in this manner, they can be automatically accessed in subsequent lifecycle phases (e.g., Service Construction lifecycle phase, Deployment Plan Generation lifecycle phase, etc.) and facilitate various automations in those phases.

It should be appreciated that process 300 is illustrative and that variations and modifications are possible. For example, steps described as sequential may be executed in parallel, order of steps may be varied, and steps may be modified, combined, added, or omitted. One of ordinary skill in the art would recognize other variations, modifications, and alternatives.

Figure 11:
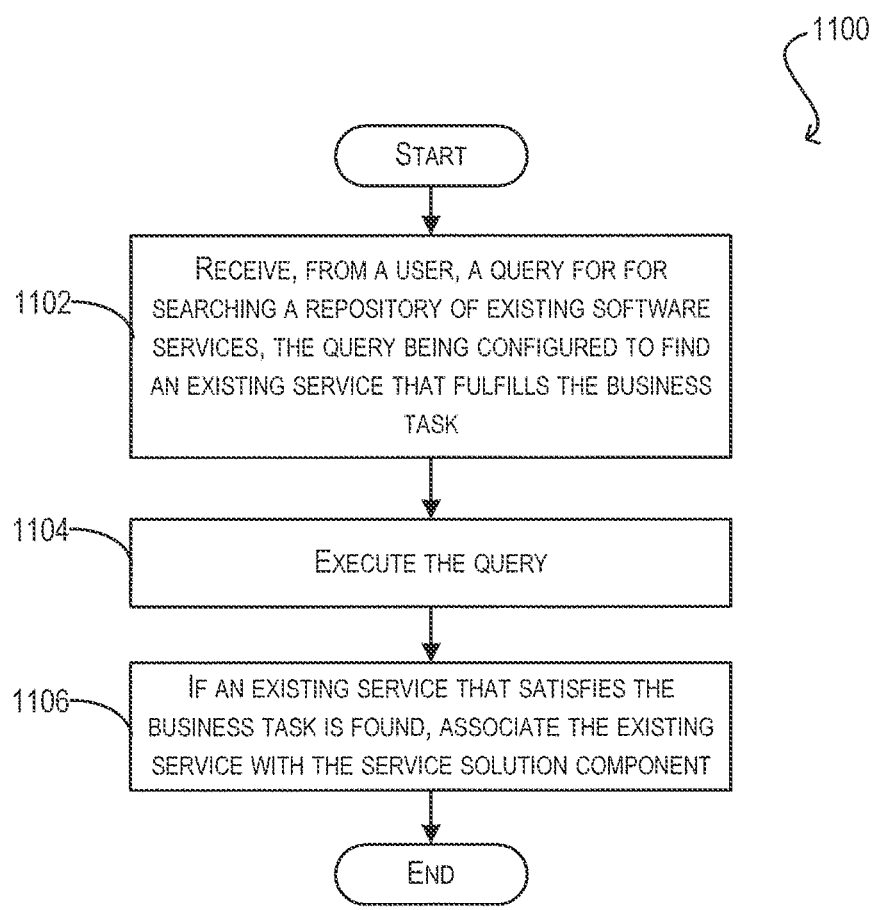
FIG. 11 is a flow diagram illustrating a process for identifying an existing service for fulfilling a business task in accordance with an embodiment of the present disclosure.

As noted above, PLW can provide a mechanism that allows solution architects to search for existing services that may fulfill the functional requirements of a particular service solution component. This obviates the needs to implement a new service for the service solution component at the Service Construction phase and thereby promotes a guiding principle of SOA, which is service reuse. FIG. 11 is a flow diagram of a process 1100 for identifying existing services according to a embodiment of the present disclosure. In one set of embodiments, process 1100 can performed as part of block 304 of FIG. 3 (e.g., receiving a definition of a service solution component).

Figure 12:
FIG. 12 is a screenshot of a user interface for carrying out the process of FIG. 11 in accordance with an embodiment of the present disclosure.

At block 1102, PLW can receive from a user (e.g., a solution architect) a query for searching a service repository, where the query is configured to find an existing service that fulfills the requirements of a particular service solution component/business task. FIG. 12 illustrates an example PLW user interface 1200 that shows a dialog for entering such a search query. In various embodiments, the service repository can provide an up-to-date view of services that have already been implemented and/or deployed. In addition, the service repository can be automatically categorized according to a predefined structure to facilitate searching.

Once the query is executed and a reusable existing service is found, PLW can associate the existing service with the service solution component (blocks 1104, 1106 of FIG. 11). This association can be stored in the shared data store and can be used, e.g., during deployment plan generation to pull the metadata for that existing service into the deployable package.

It should be appreciated that process 1100 is illustrative and that variations and modifications are possible. For example, steps described as sequential may be executed in parallel, order of steps may be varied, and steps may be modified, combined, added, or omitted. One of ordinary skill in the art would recognize other variations, modifications, and alternatives.

in addition to capturing functional definitions (during the Functional Definition lifecycle phase in certain embodiments PLW can also be used to facilitate the identification of implemented services that should be deployed as part of an SOA application (during the Deployment Plan Generation lifecycle phase). This functionality is described in further detail in the "Deployment Plan Generator" section below.

Service Constructor

Figure 13:
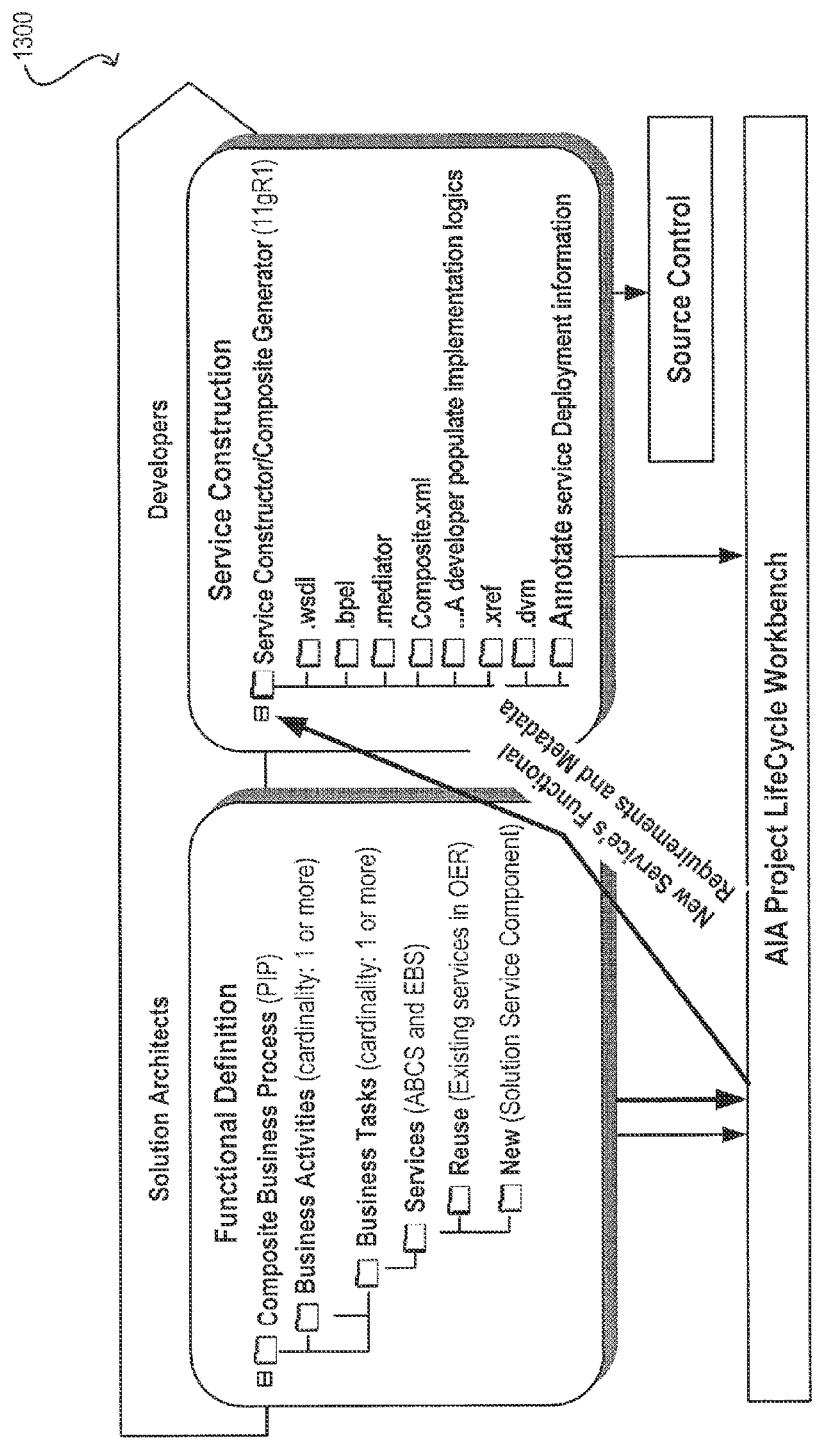
FIG. 13 is a simplified block diagram illustrating the flow of information from the functional definition lifecycle phase to the service construction lifecycle phase in accordance with an embodiment of the present disclosure.

Once business process and service solution component definitions have been entered and stored in the PLW backend during the Functional Definition lifecycle phase, information can be accessed and leveraged to automatically generate service artifacts during the Service Construction lifecycle phase using an AIA tool known as the Service Constructor. FIG. 13 is a simplified block diagram 1300 illustrating the flow of this functional information between the Functional Definition and Service Construction phases.

The Service Constructor provides a number of benefits over prior art approaches to service development. For example, by retrieving functional definitions from the PLW backend, the Service Constructor can automate most (if not all) of the information exchange that was previously performed manually between solution architects and developers. Further, by automatically generating portions of service artifacts, the Service Constructor can promote coding best practices and enforce a particular programming model. Yet further, the Service Constructor can auto-populate many implementation details based on the previously defined functional information, thereby improving development productivity.

In one set of embodiments, the Service Constructor can be implemented as a plug-in or extension for an integrated development environment, such as Oracle JDeveloper. In other embodiments, the Service Constructor can be implemented as a standalone program.

Figure 14:
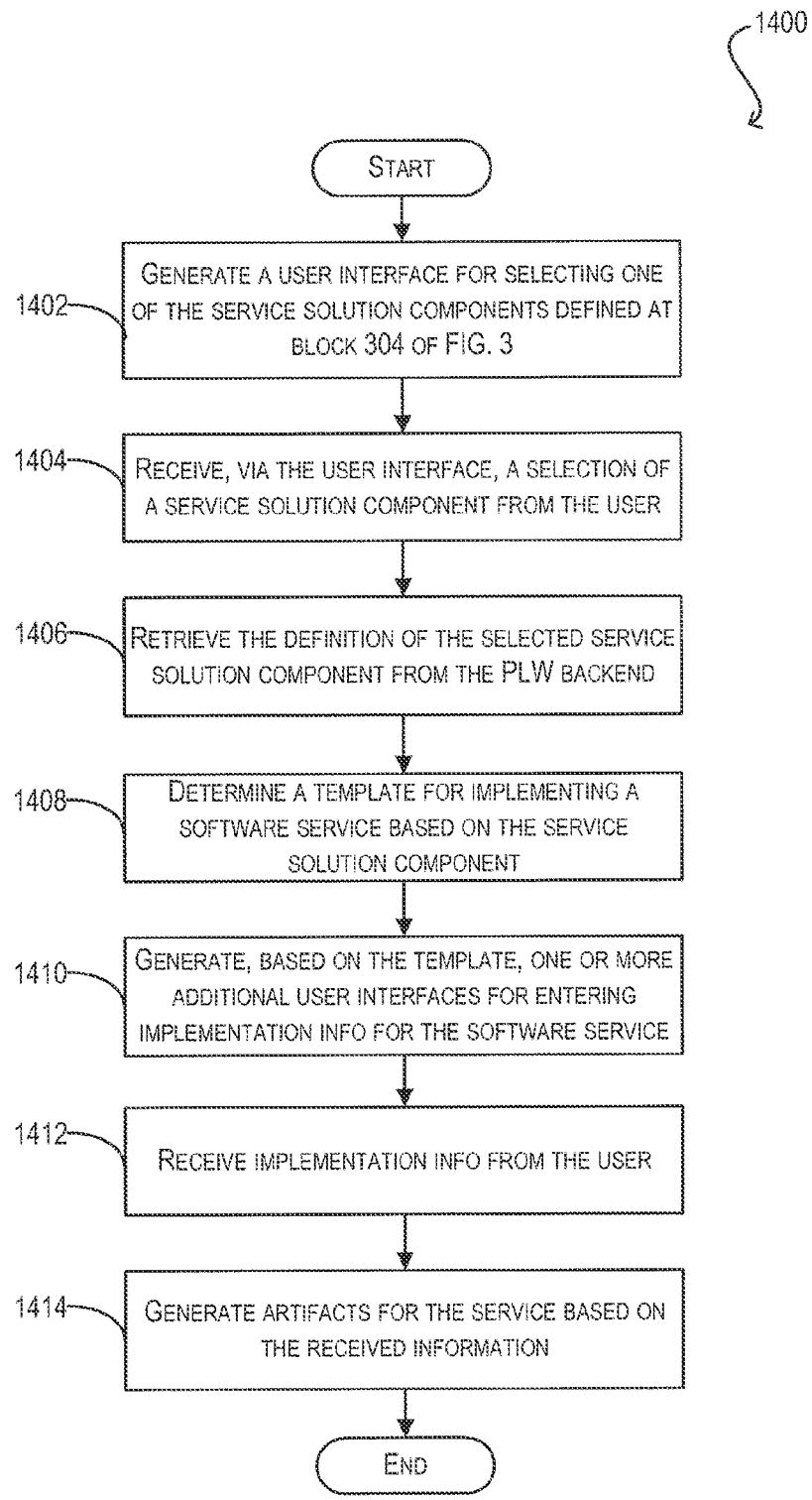
FIG. 14 is a flow diagram illustrating a process for automatically generating service artifacts in accordance with an embodiment of the present disclosure.

FIG. 14 is flow diagram of a process 1400 for automatically generating service artifacts via the Service Constructor according to an embodiment of the present disclosure. Portions of process 1400 can be implemented in software, hardware, or a combination thereof. As software, process 1400 can be encoded as program code stored on a computer-readable storage medium.

Figure 15:
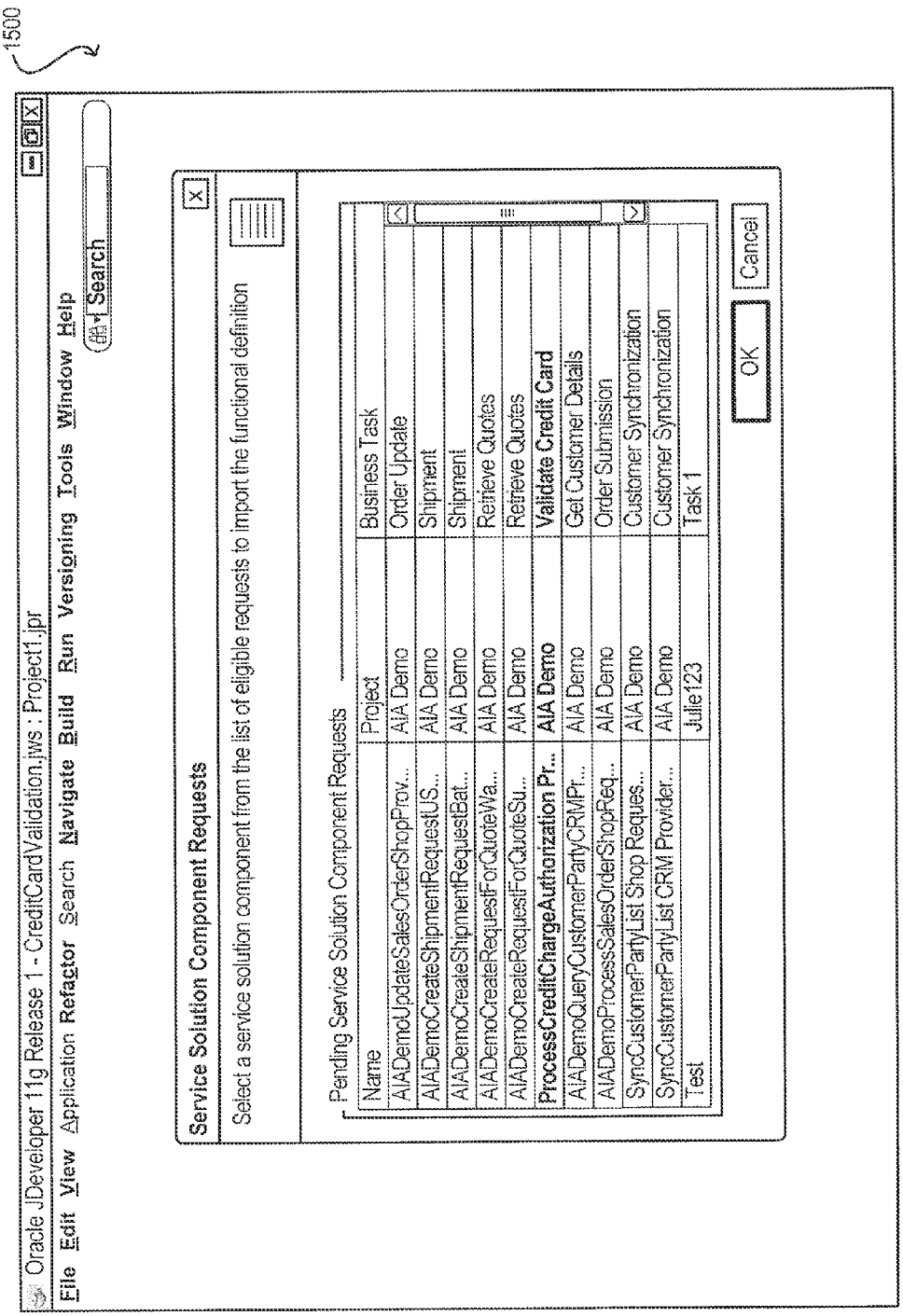

At block 1402, the Service Constructor can generate a user interface for selecting one of the service solution components defined at block 304 of FIG. 3. FIG. 15 illustrates an example Service Constructor user interface 1500 for performing such a selection. Generally speaking, user interface 1500 will be presented to a user (e.g., developer) that is tasked with implementing a software service for a particular service solution component. Accordingly, user interface 1500 can display a list of all of the service solution components that have been defined in the system by solution architects, but have not yet been implemented. From the list, the developer can select the particular service solution component that he/she has been tasked to develop (block 1404).

Once a service solution component has been selected, the Service Constructor can retrieve the definition of the service solution component from the shared data store in the PIM backend and present one or more additional user interfaces to the developer (e.g., a "wizard" UI flow) (block 1410). These user interfaces can allow the developer to overwrite one or more aspects of the service solution component definition (for example, in response to business requirement changes that have come to light since the solution architect entered the function definition into the system). The user interfaces can also allow the developer to enter implementation information pertaining to the service.

In a particular embodiment, the Service Constructor can select a predefined template for the service solution component based on an attribute (e.g., service type) in the component's functional definition, and use the predefined template to determine what information will be gathered from the developer via the wizard interface (block 1408).

Figure 16:
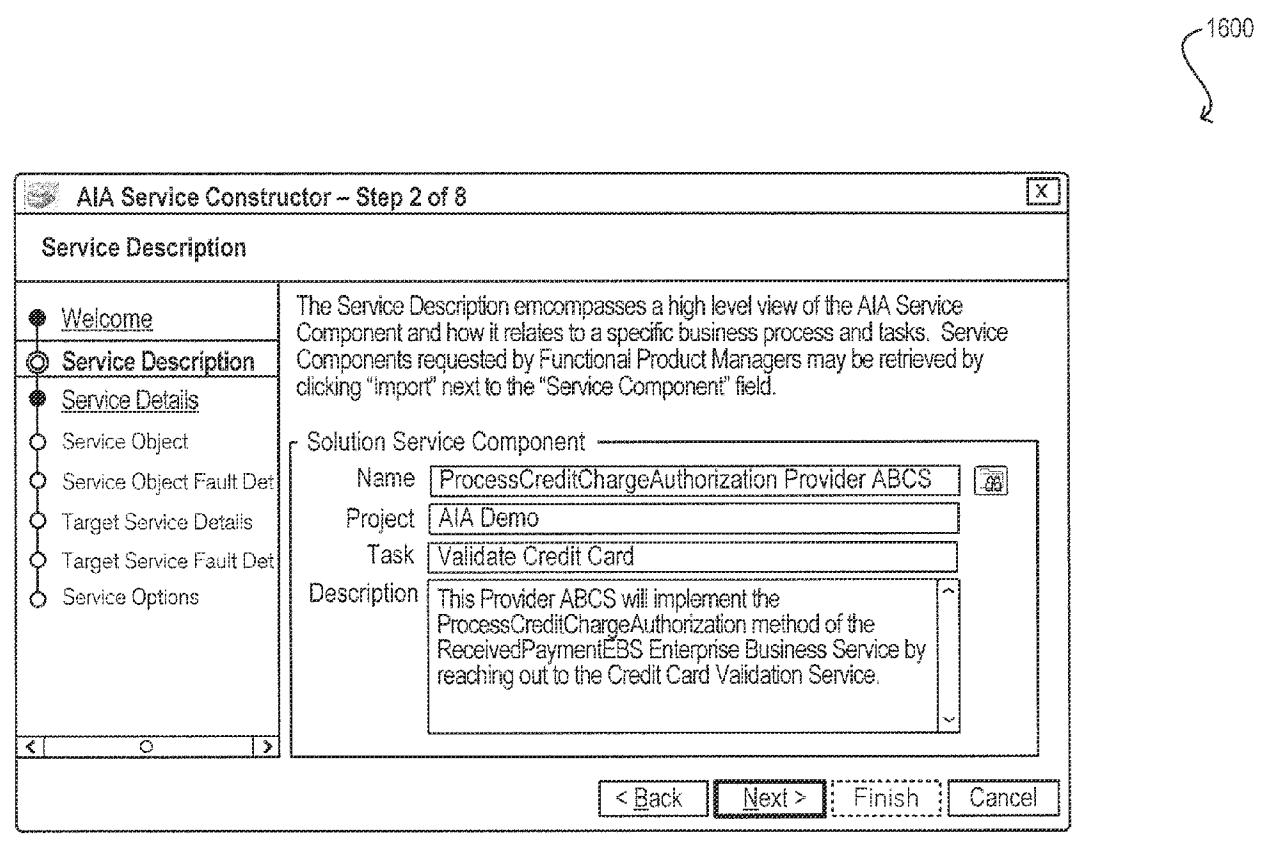
Figure 17:
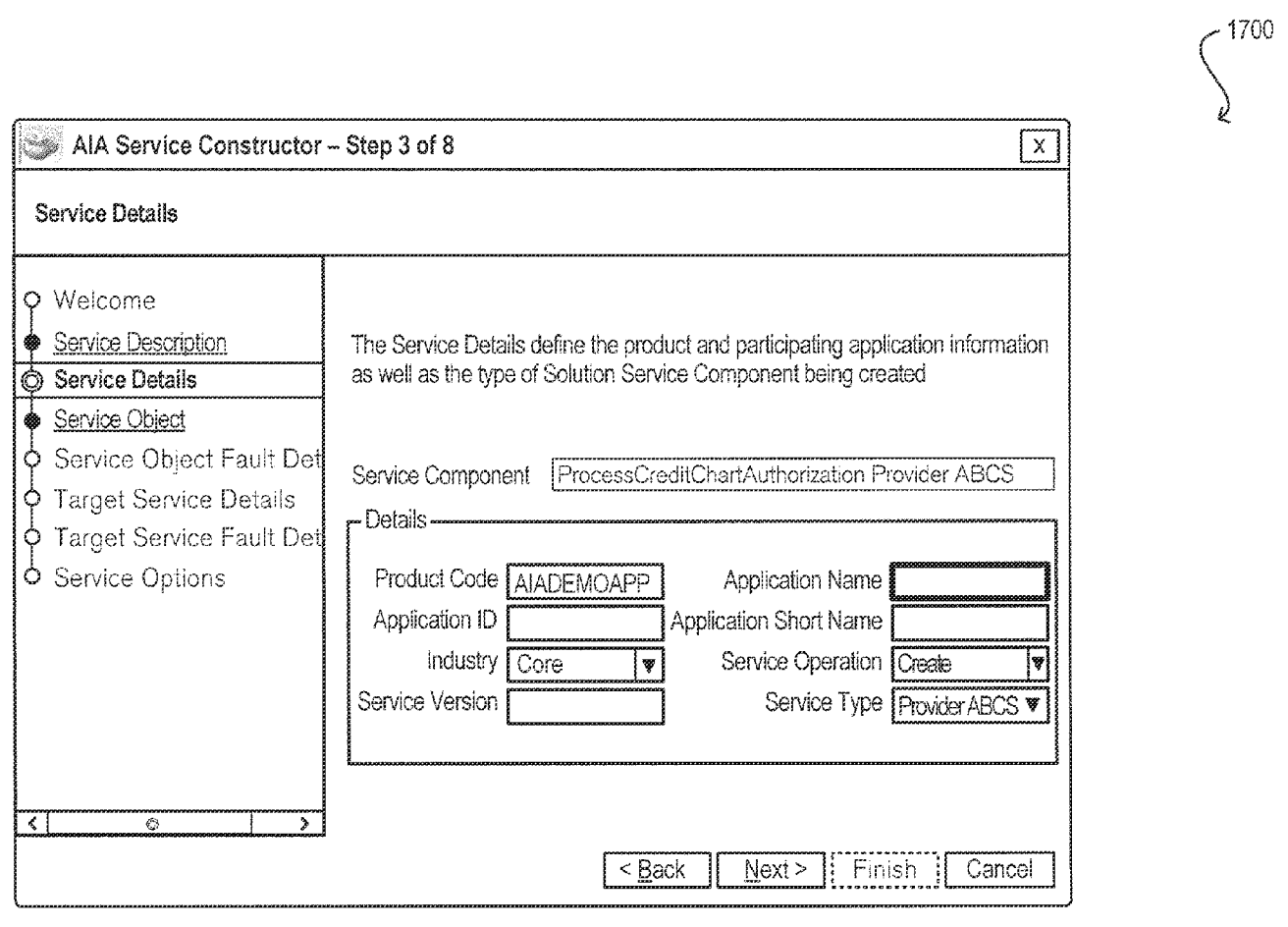

FIGS. 16 and 17 illustrate example Service Constructor user interfaces 1600 and 1700 that depict a service solution component definition that has been imported into the Service Constructor. As shown, the developer can overwrite various attributes that were defined during the Functional Definition lifecycle phase, such as description, service type, product code, and the like. In addition, the developer can add additional functional information.

FIGS. 18-22 illustrate example Service Constructor user interfaces 1800, 1900, 2000, 2100, and 2200 for entering service implementation details. As shown, these details can include message exchange patterns used by the service, target service information, service options, and deployment-related information. Where possible, the Service Constructor can auto-populate certain fields in user interfaces 1800, 1900, 2000, 2100, and 2200 based on information entered in other fields. For example, in user interface 1800, the Service Constructor can auto-populate the fields under "Enterprise Business Message" based on a particular WSDL file selected by the developer.

Figure 23:
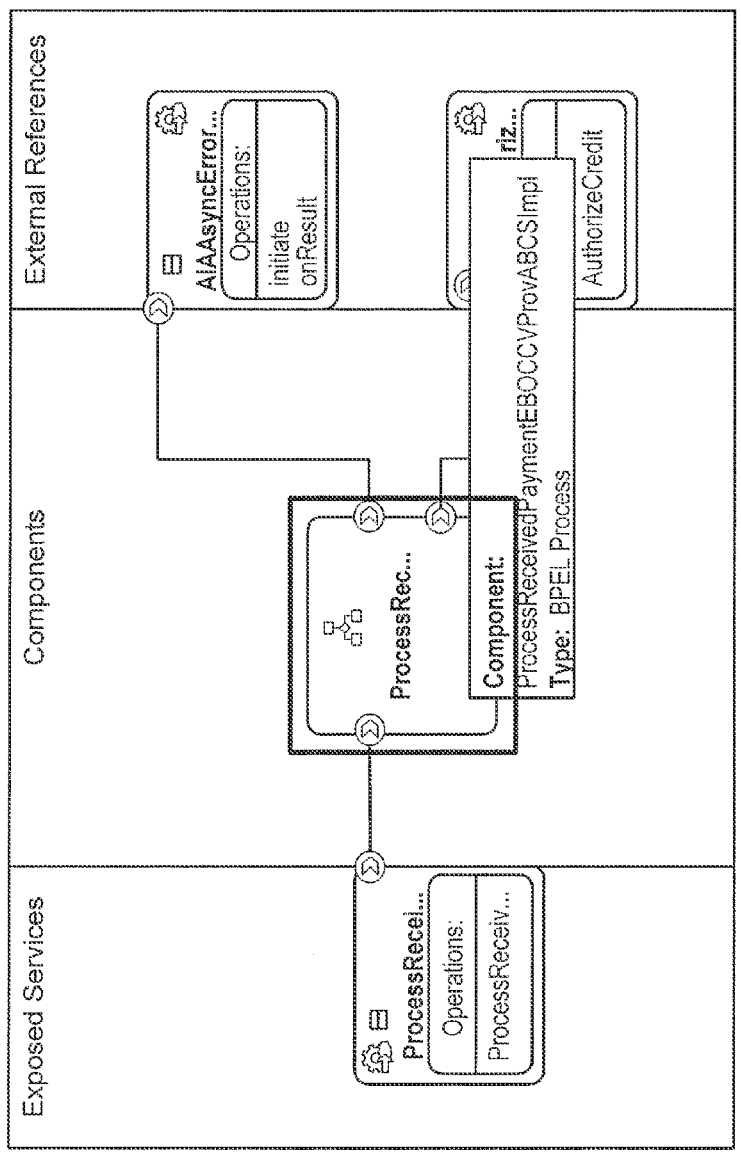

Returning to FIG. 14, once all of the requested implementation information is received from the developer (block 1412), the Service Constructor can automatically, generate, based on the gathered information and the functional definition imported from RIM, a "skeleton" of service artifacts for fulfilling the functionality of the selected service solution component (block 1414). The service artifacts (which can include skeleton WSDLs, skeleton composites, skeleton BPELs, etc.) can then be further developed and enriched by the developer to meet the full functional specification of the service solution component. FIG. 23 illustrates an example user interface 23 showing a schematic view of service artifacts as generated by the Service Constructor.

In certain embodiments, the auto-generated skeleton can incorporate code practices and architectural patterns that ensure that the resulting service is extensible and upgrade-safe. In this manner, a degree of coding uniformity can be imposed on the development process, even if services are implemented by different developers (possibly from different organizations).

Although not shown in FIG. 14, once development of a service has been completed, the developer can invoke an ALA tool known as the Harvester to publish metadata related to the service artifacts to the PLW backend (described in further detail below). The developer can also check-in the service artifacts into source control.

It should be appreciated that process 1400 is illustrative and that variations and modifications are possible. For example, steps described as sequential may be executed in parallel, order of steps may be varied, and steps may be modified, combined, added, or omitted. One of ordinary skill in the art would recognize other variations, modifications, and alternatives.

Harvester

The Harvester is an AIA client program that collects metadata related to an implemented service and publishes that metadata to the shared data store in the PLW backend. Upon receipt of this metadata, PLW can associate the metadata with the service solution components and/or business tasks entered by solution architects during the Functional Definition lifecycle phase, and store these associations in the shared data store. Examples of metadata collected by the Harvester include deployment information about a service, relationships between service artifacts (e.g., an asset graph), and functional definition information that may have been updated or overwritten by the developers. In certain embodiments, this harvested metadata can be used during the Deployment Plan Generation lifecycle phase to facilitate the automated generation of a deployment plan.

In one set of embodiments, the Harvester can be implemented as a command-line program. In other embodiments, the Harvester can be implemented as a development program plug-in, similar to the Service Constructor.

In some embodiments, the Harvester can also be used to gather information about an SOA application that has already been deployed at a customer site. This harvested information can be published to the service repository (discussed with respect to FIG. 11) to maintain an up-to-date list of deployed services that can be subsequently reused.

Deployment Plan Generator

As discussed with respect to FIG. 1, in the Deployment Plan Generation lifecycle phase, installation developers are responsible for identifying and packaging together all of the services that make up an SOA application. In the prior art, this process typically required the installation developers to contact the solution architects and developers to determine (1) the services to be included in the application and (2) the deployment information for each service. Based on this information, the installation developers would manually create a deployment script.

Figure 24:
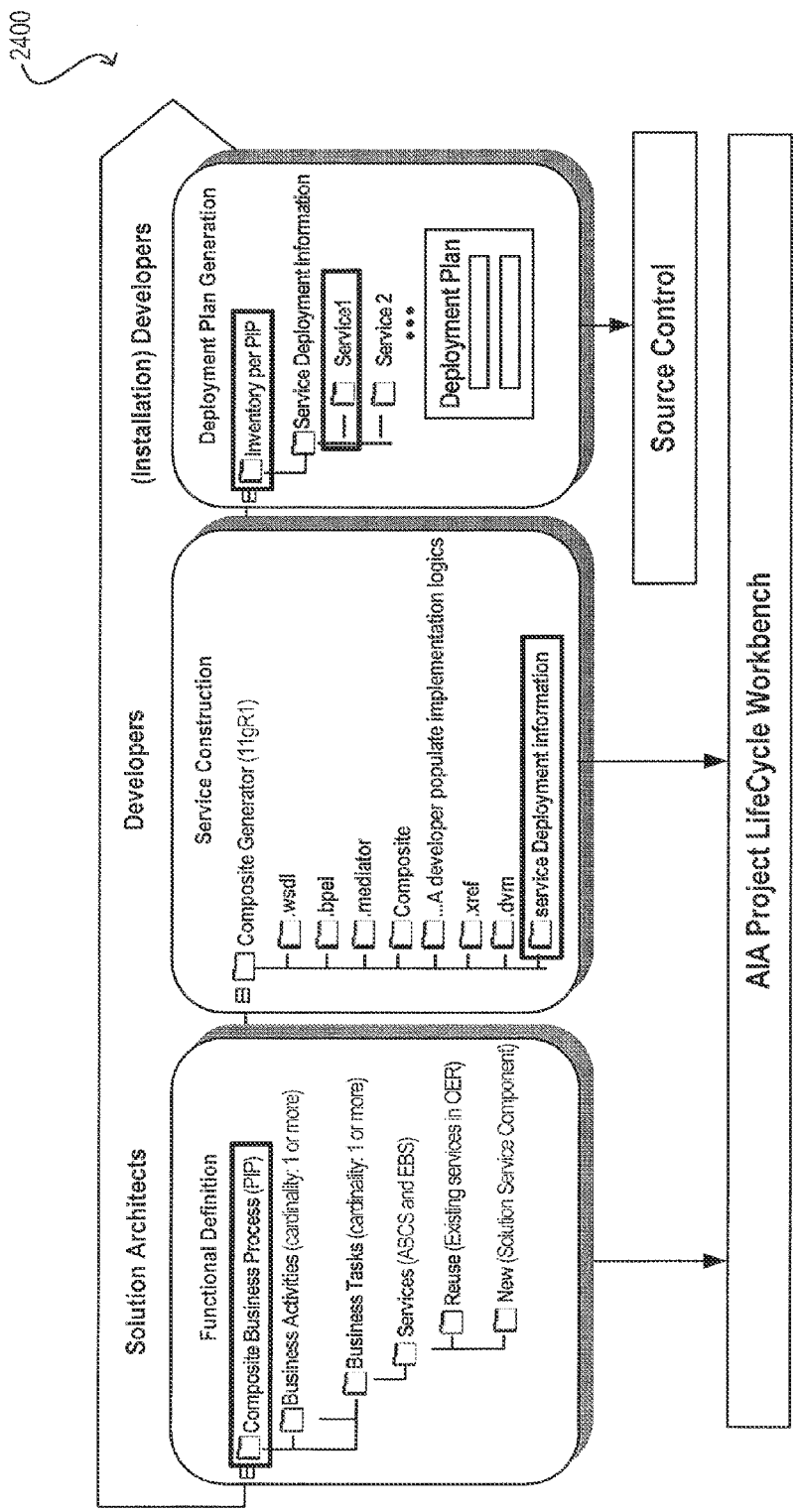
FIG. 24 is a simplified block diagram illustrating the flow of information from the functional definition and service construction lifecycle phases to the deployment plan generation lifecycle phase in accordance with an embodiment of the present disclosure.

Embodiments of the present disclosure can automate this process via a tool known as the Deployment Plan Generator. In conjunction with PLW, the Deployment Plan Generator can enable a user (e.g., installation developer) to pick and choose implemented services to be included in a given application deployment. The Deployment Plan Generator can then automatically generate an appropriate deployment plan based on the user's selections and the service artifact metadata captured in the Service Construction lifecycle phase (see, e.g., diagram 2400 of FIG. 24). As described above, the metadata captured for a given service can include deployment information about the service, as well as deployment information about all of the components that the service may use (e.g., queues, database adapters, etc.). Accordingly, the deployment plan can be automatically generated based on this metadata without any intervention from developers or other individuals.

Figure 25:
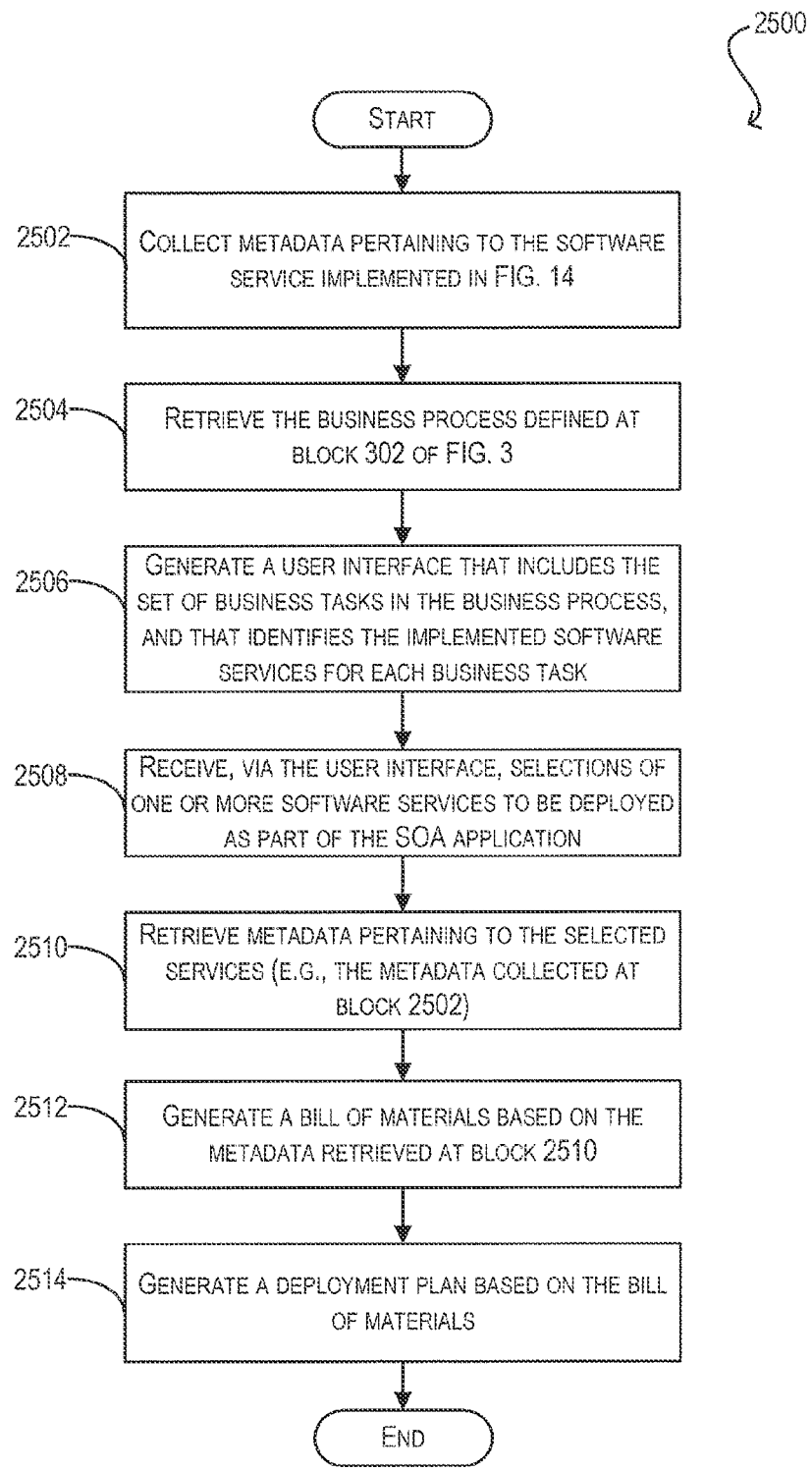
FIG. 25 is a flow diagram illustrating a process for automatically generating a deployment plan in accordance with an embodiment of the present disclosure.

FIG. 25 illustrates a flow diagram of a process 2500 for automatically generating a deployment plan via PLW and the Deployment Plan Generator according to an embodiment of the present disclosure. Portions of process 2500 can be implemented in software, hardware, or a combination thereof. As software, process 2500 can be encoded as program code stored on a computer-readable storage medium.

At block 2502, metadata can be collected pertaining to one or more implemented services (e.g., the service implemented in FIG. 14). In one set of embodiments, this collection can be performed during the Service Construction lifecycle phase using the Harvester as described above. In another set of embodiments, this collection can be performed during the Deployment Plan Generation phase.

Figure 26:
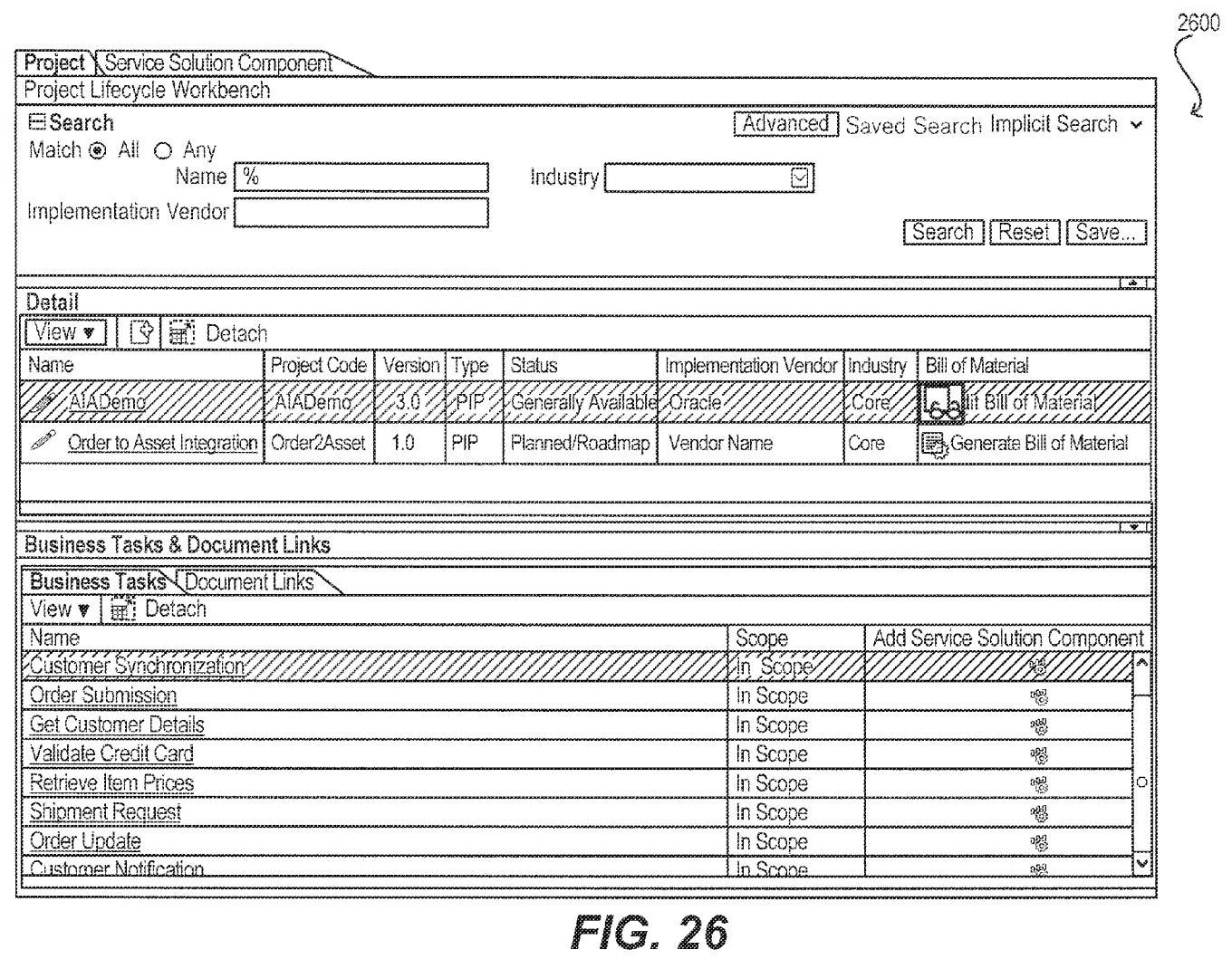

At block 2504, PIM can retrieve a definition of a business process/SOA application (e.g., the business process defined at block 302 of FIG. 3) from the PLW backend for the purpose of generating a deployment plan for the application. For example, an installation developer can log into PLW and access a list of previously entered business processes. From this list, the installation developer can select a particular application by activating, e.g., a "Generate Bill-of-Material" control (see PLW user interface 2600 of FIG. 26).

Figure 27:
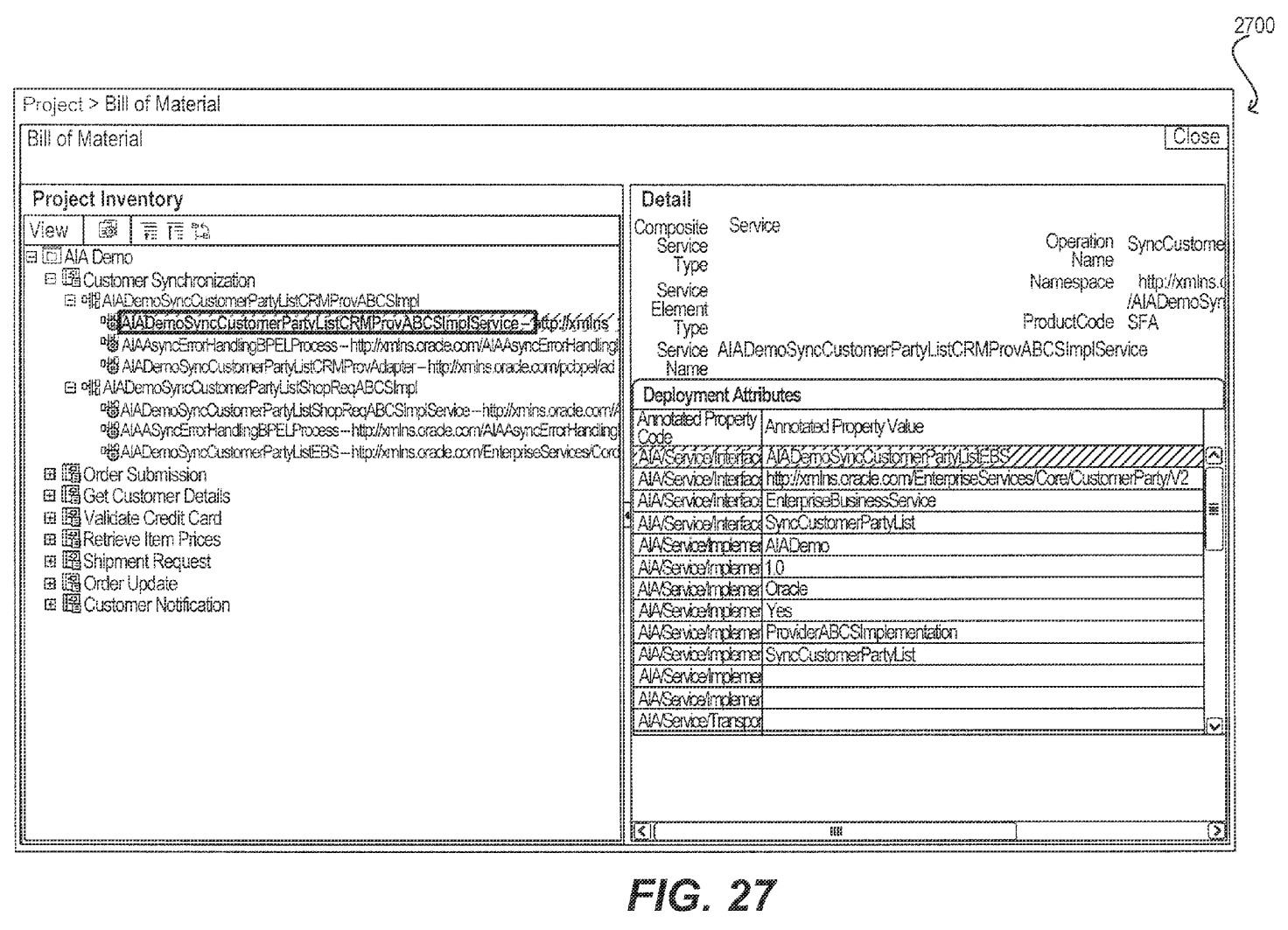

Upon activating the "Generate Bill-of-Material" control, PLW can generate a task/service hierarchy that depicts all of the business tasks defined for the process/application, as well as the services implemented for each business task (block 2506 of FIG. 25). FIG. 27 illustrates an example PLW user interface 2700 that includes such a hierarchy. In one set of embodiments, the generation of user interface 2700 can be based on the business process/service solution component definitions captured during the Functional Definition lifecycle phase and the artifact metadata collected at block 2502.

From user interface 2700, the installation developer can add or remove business tasks and add or remove services. In addition, the installation developer can view the metadata deployment information) for each service.

Figure 28:
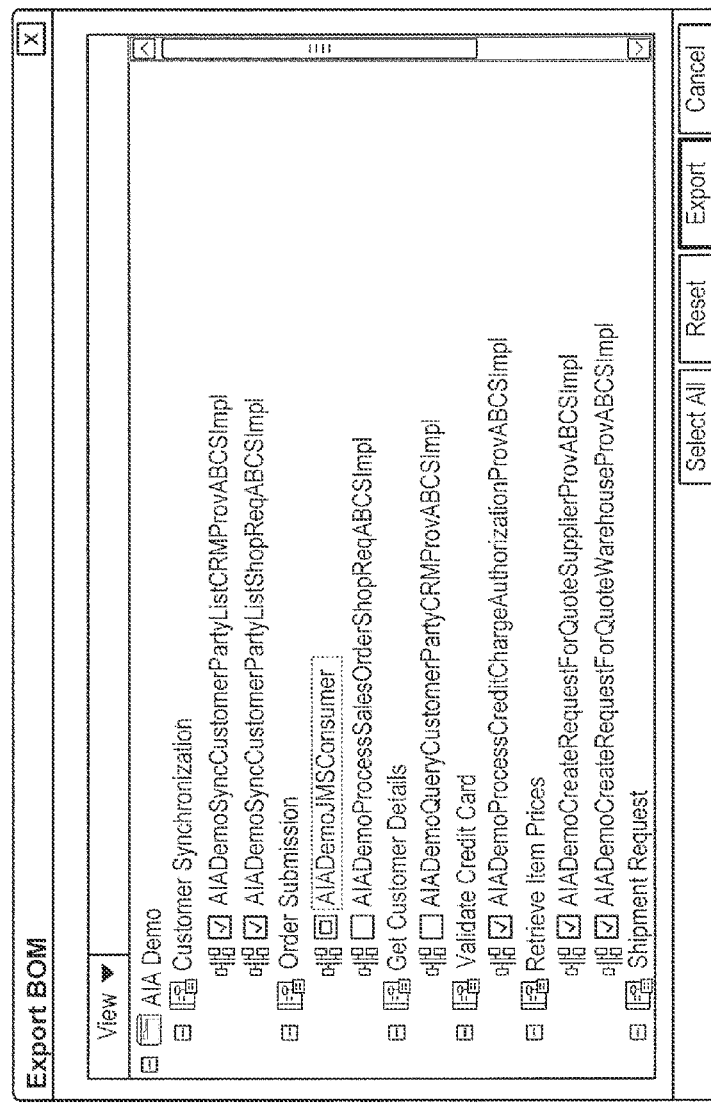

Once the installation developer has modified the structure of the application as needed via user interface 2700, the installation developer can activate an "Export BOM" control. Activating this control can cause a dialog window to be rendered that depicts the task/service hierarchy of user interface 2700 with a checkbox next to each service (see user interface 2800 of FIG. 28). From user interface 2800, the installation developer can select or de-select particular services to be included in the deployment. Based on the developer's selections, the Deployment Plan Generator can create an intermediate file known as a "bill of materials" (block 2512). Based on the bill of materials, the Deployment Plan Generator can automatically generate a final deployment plan for the application (block 2514).

In various embodiments, the deployment plan can specify all of the objects and configurations that are needed for deployment of the application, including not only services, but also queues, adapters, DB objects, and the like. An example deployment plan is described with respect to FIG. 30 below. In order to automatically generate this plan, the Deployment Plan Generator relies on both the functional definitions entered by the solution architects during the Functional Definition lifecycle phase and the artifact metadata (including deployment information) harvested during the Development lifecycle phase.

Once the deployment plan has been created, the service artifacts and related data can be packaged and shipped to customers for installation. In one set of embodiments, all of the seed data used to generate the deployment plan (e.g., data in the PLW backend, the bill of materials, etc.), as well as the PLW application, related tools, and the deployment plan itself, can be provided to customers. Accordingly, customers can leverage the functionality described herein to add new services and create custom deployment plans to customize the application to their specific needs.

Figure 29:
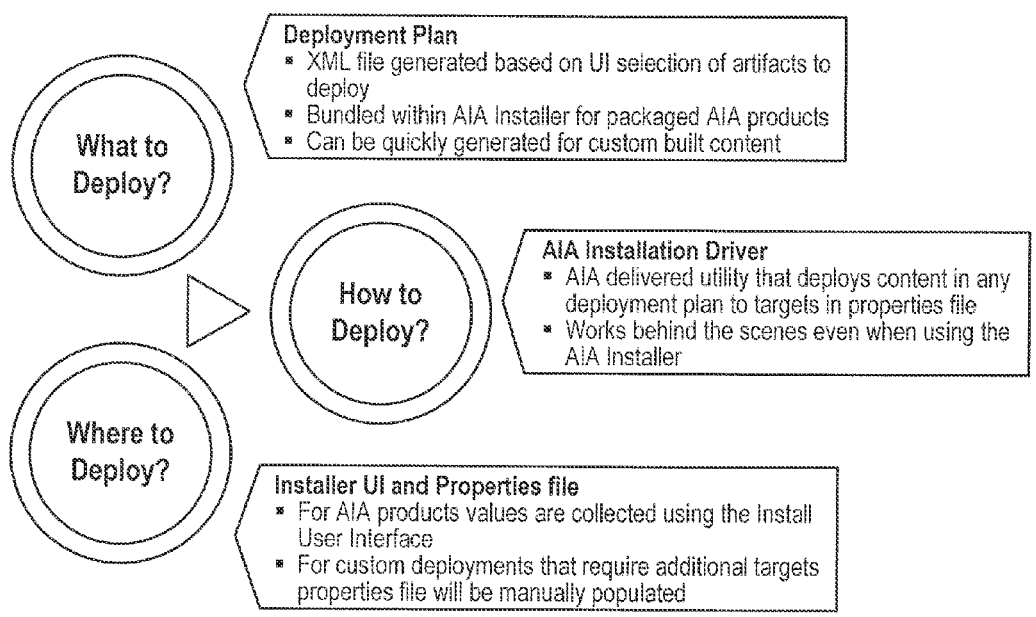
FIG. 29 is a simplified block diagram illustrating inputs to the installation driver in accordance with an embodiment of the present disclosure.

It should be appreciated that process 2500 is illustrative and that variations and modifications are possible. Steps described as sequential may be executed in parallel, order of steps may be varied, and steps may be modified, combined, added, or omitted. For example, in one set of embodiments, the Deployment Plan Generator can directly create a deployment plan from the selections and metadata received at blocks 2508 and 2510 (rather than creating an intermediary bill of materials). One of ordinary skill in the art would recognize other variations, modifications, and alternatives.
Installation Driver As discussed with respect to FIG. 1, in the Deploy lifecycle phase, customer IT deploys a packaged SOA application at a customer site. In one set of embodiments, AIA can include a tool known as the Installation Driver that facilitates this deployment process. In particular, the Installation Driver can retrieve the deployment plan created during the Deployment Plan Generation lifecycle phase (which defines "what to deploy") and can interpret the deployment plan against a deployment properties file (which defines "where to deploy"). Based on the deployment plan and deployment properties file, the Installation Driver can automatically deploy the application content to appropriate target locations at the customer site (see FIG. 29). By separating out deployment content information (i.e., the deployment plan) from deployment location information (i.e., the deployment properties file), the same deployment plan can be quickly and easily applied to different target locations and topologies. For example, the same deployment plan can be rapidly deployed against a variety of topology variations at both application server and database levels.

Figure 30:
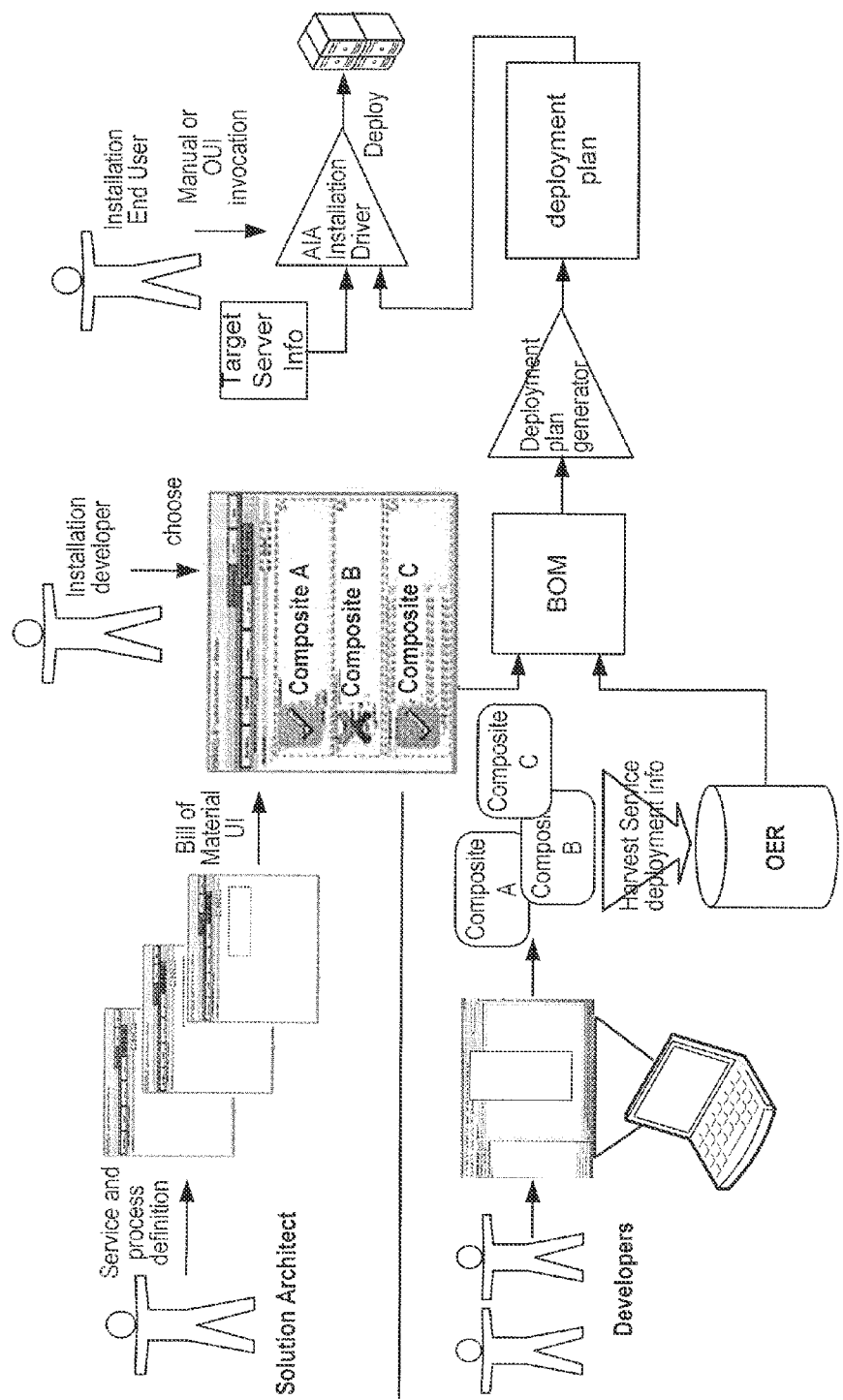
FIG. 30 is a simplified block diagram illustrating an overall SOA development lifecycle as facilitated by AIA in accordance with an embodiment of the present disclosure.

FIG. 30 is a simplified block diagram illustrating an overall SOA development lifecycle (from the functional definition phase to the deployment phase) as facilitated by This figure depicts the different actors at each lifecycle stage and how the deployment process is tied to the preceding phases (i.e., functional definition, service construction, deployment plan generation) in the lifecycle.

In various embodiments, the Installation Driver not only deploys services, but can also handle the deployment of queues, xRefs, DVMs, adapters, DB objects, and the like. In addition, the Installation Driver can handle errors during deployment and can include intelligence to automatically deploy to different physical topologies, such as remote servers, clusters, etc. The database schemas can also be configured instantly in any manner as determined by a user. Upon completion of deployment, customers can immediately use the application.

As described above, in some embodiments the packaged SOA application can include the PLW application, related AIA tools, and seed data. Accordingly, customers can install and use the pre-built application contents in the deployed package, or introduce their own, homegrown services, cherry-pick from among the pre-built AIA-shipped services, and generate their own, custom deployment plans. The Installation Driver can interpret these custom deployment plans and install the required integration accordingly.

Figure 31:
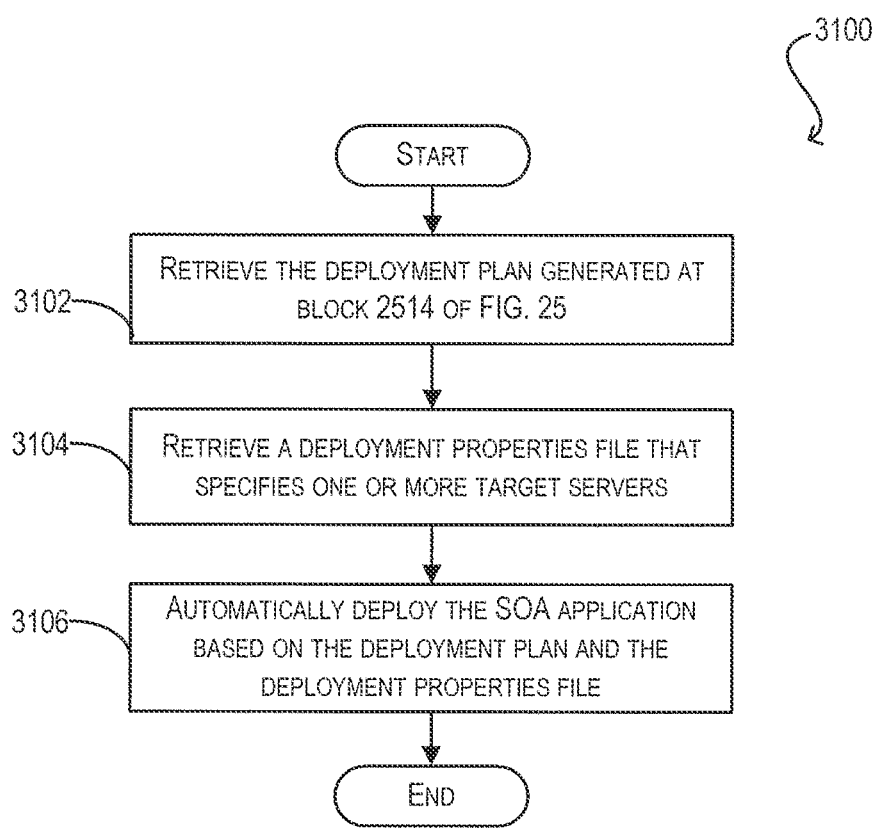
FIG. 31 is a flow diagram illustrating a process for deploying an SOA application in accordance with an embodiment of the present disclosure.

FIG. 31 is a flow diagram of a process 3100 for installing and deploying an SOA application via the Installation Driver according to an embodiment of the present disclosure. Portions of process 3100 can be implemented in software, hardware, or a combination thereof. As software, process 3100 can be encoded as program code stored on a computer-readable storage medium.

At block 3102, the Installation Driver can retrieve a deployment plan generated during the Deployment Plan Generation lifecycle phase (e.g., block 2514 of FIG. 25). FIG. 32 illustrates an example deployment plan 3200 according to an embodiment of the present disclosure. As shown, deployment plan 3200 can be expressed in Extensible Markup Language (XML). The content defined under the "Deployments" XML tag can define those services that were selected to be deployed. The content defined under the "Configurations" XML tag can define various configurations that are required for the services to operate successfully. Note that the services were selected using the PLW UI but the configuration information was enriched based on the harvested service metadata. This loose coupling enables rapid deployment.

In one set of embodiments, deployment plan 3200 can correspond to the unmodified version shipped with the packaged SOA application. In another set of embodiments, deployment plan 3200 can be extended by the customer prior to deployment. For example, customers can add additional tags under "Deployments" and 'Configurations," and can also add post and/or pre deployment actions. These custom tags can be interpreted by the Installation Driver provided that they adhere to the schema defined for the plan.

At block 3104, the installation Driver can retrieve a deployment properties file that specifies one or more target servers for the deployment. In one set of embodiments, values in the deployment properties file can be entered manually. In alternative embodiments, the deployment properties files can be generated by the Installation Driver based on information entered by a user via one or more user interface screens.

FIG. 33 illustrates an example deployment properties file 3300 according to an embodiment of the present disclosure. Like deployment plan 3200, deployment properties file 3300 can be expressed in XML. Deployment properties file 3300 can include various tags that correspond to content in deployment plan 3200. For example, in FIG. 32, deployment plan 3200 includes the attribute "wlserver" that is assigned the value "fp." This reference to "fp" corresponds to the details of an application server (e.g., Weblogic server) defined under the "fp" tag in deployment properties file 3300. In this manner, deployment properties file 3300 can provide target location information for any of the objects defined in deployment plan 3200. For example, deployment properties file 3300 can identity target applications servers, target database servers, and the like. In one set of embodiments, additional information (e.g., name/value pairs) can be added to deployment properties file 3300 to define, for example, additional target servers. These names can then be cross referenced in the deployment plan. Since the deployment plan does not include actual server names/addresses, the deployment plan can be deployed any number of times against any number of servers.

Once the deployment plan and deployment properties file are retrieved, the Installation Driver can automatically install and deploy the application to the appropriate target locations (block 3106 of FIG. 31). As noted above, the Installation Driver can handle the details of deploying the specified services and their associated configurations, without any input from the operator. The Installation Driver can also interpret and process custom deployment commands/activities that are added to the deployment plan via custom tags.

It should be appreciated that process 3100 is illustrative and that variations and modifications are possible. For example, steps described as sequential may be executed in parallel, order of steps my be varied, and steps may be modified, combined, added, or omitted. One of ordinary skill in the art would recognize other variations, modifications, and alternatives.

As described above, embodiments of the present disclosure provide a streamlined development lifecycle experience for building SOA based applications. In particular, the components described herein can allow each lifecycle phase to support downstream activities in an automated manner, thereby enforcing SOA best practices, enhancing development productivity, and ensuring the quality of the final SOA deliverables.

Figure 34:
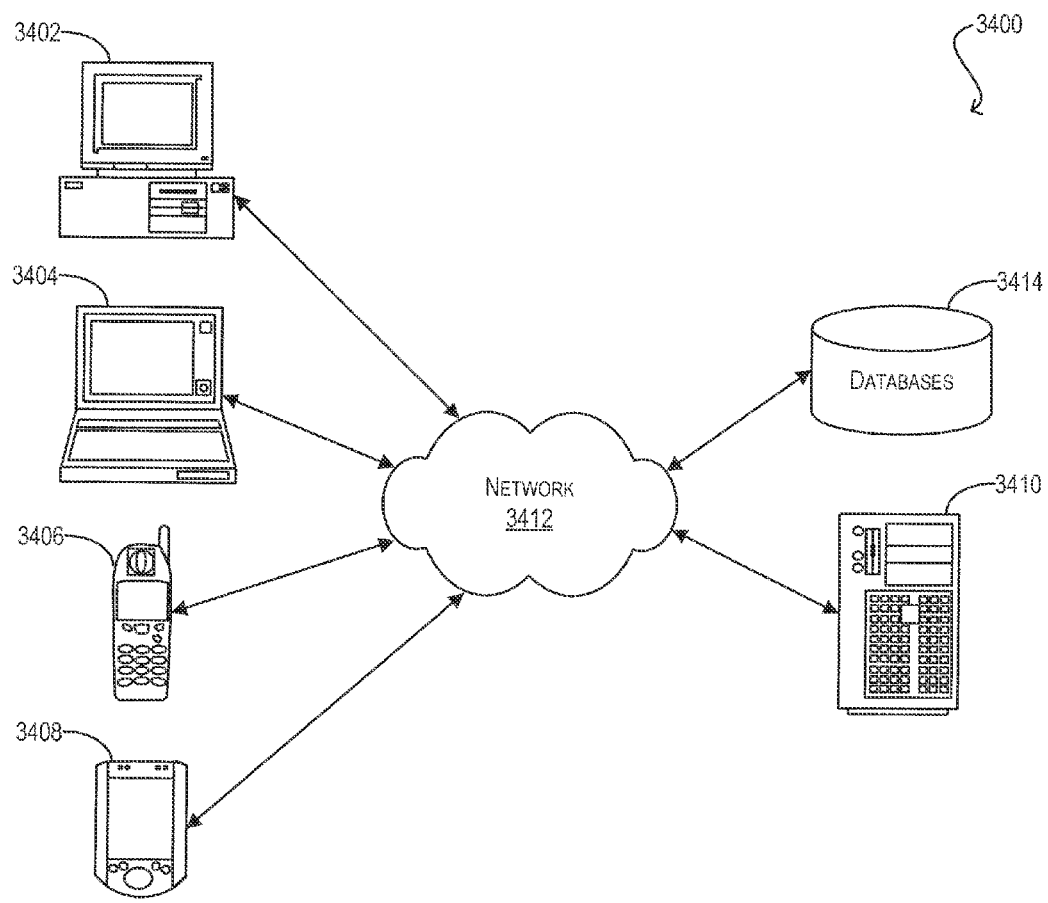
FIG. 34 is a simplified block diagram illustrating a system environment that can be used in accordance with an embodiment of the present disclosure.

FIG. 34 is a simplified block diagram illustrating a system environment 3400 that can be used in accordance with an embodiment of the present disclosure. As shown, system environment 3400 can include one or more client computing devices 3402, 3404, 3406, 3408, which can be configured to operate a client application such as web browser, proprietary client (e.g., Oracle Forms), and/or the like. In various embodiments, client computing devices 3402, 3404, 3406, 3408 can be used to execute the client-side code for one or more of the application and tools described above (e.g., PLW, Service Constructor, etc.).

Client computing devices 3402, 3404, 3406, 3408 can be general purpose personal computers (e.g., personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 3402, 3404, 3406, 3408 can be any other electronic device capable of communicating over a network, such as network 3412 described below). Although system environment 3400 is shown with four client computing devices, it should be appreciated that any number of client computing devices can be supported.

System environment 3400 can further include a network 3412. Network 3412 can be any type of network familiar to those skilled in the art that can support data communications using a network protocol, such as TCP/IP, SNA, IPX, AppleTalk, and the like. Merely by way of example, network 3412 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 3400 can further include one or more server computers 3410 which can be general purpose computers, specialized server computers (including, e.g., PC servers, UNIX servers, mid-range servers, mainframe computers rack-mounted servers, etc.), server farms, server clusters, or any other appropriate arrangement and/or combination. In various embodiments, server 3410 can be adapted to run server-side code for one or more of the applications or tools described above (e.g., PLW, Deployment Plan Generator, etc.).

Server 3410 can run an operating system including any of those discussed above, as well as any commercially available server operating system. Server 3410 can also run any of a variety of additional server applications and/or mid-tier applications, including web servers, FTP servers, CGI servers, Java servers, database servers, and the like. Exemplary database servers can include, e.g., those commercially available from Oracle, Microsoft, Sybase, and IBM.

System environment 3400 can further include one or more databases 3414. Databases 3414 can be used to store any of the data described in the foregoing disclosure. In certain embodiments, databases 3414 can include databases that are used by the PLW backend to store functional definitions, service artifact metadata, and the like. Databases 3414 can reside in a variety of locations. By way of example, one or more of databases 3414 can reside on a storage medium local to (and/or resident in) one or more of the computers 3402, 3404, 3406, 3408, and 3410. Alternatively, databases 3414 can be remote from any or all of the computers 3402, 3401, 3406, 3408, and 3410, and/or in communication (e.g., via network 3412) with one or more of these. In one set of embodiments, databases 3414 can reside in a storage-area network (SAN) familiar to those skilled in the art. In further embodiments, databases 3411 can include relational databases, such as Oracle 11 g, that are adapted to store, update, and retrieve data in response to SQL-formatted commands.

Figure 35:
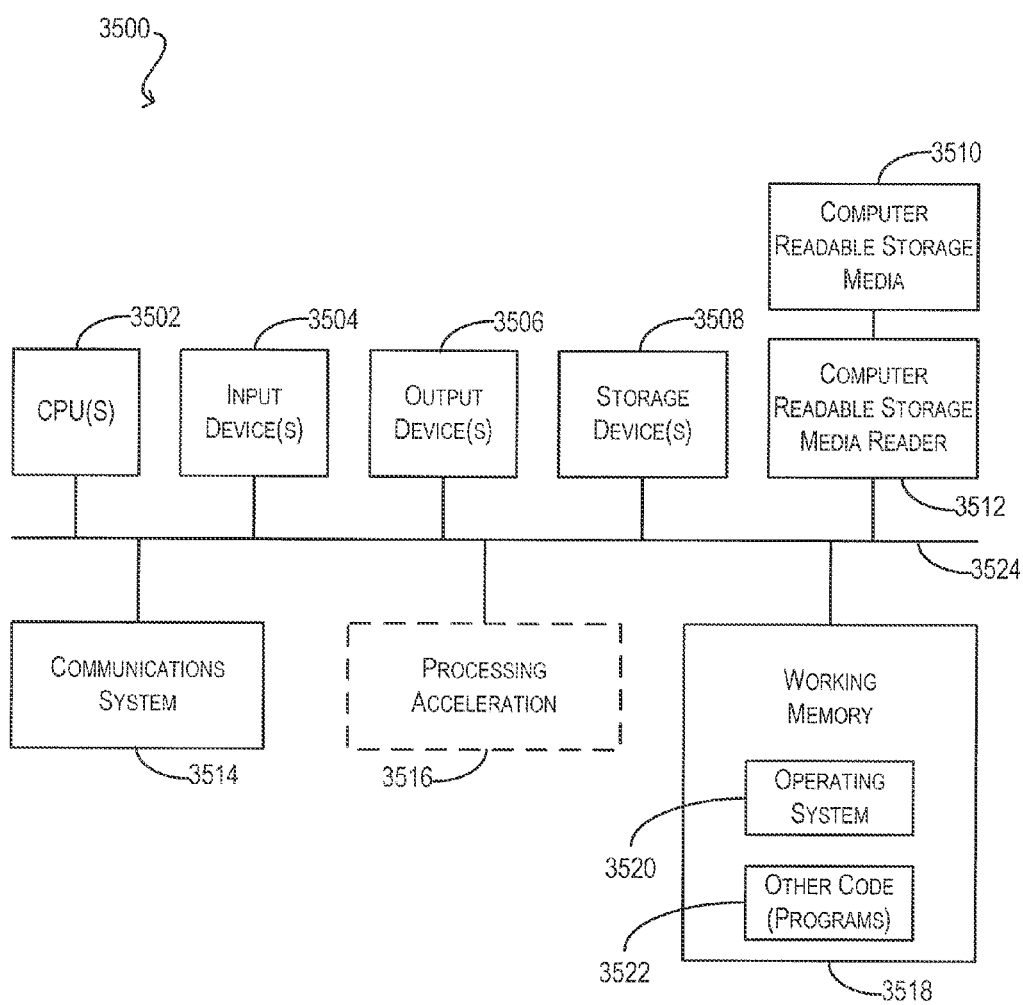
FIG. 35 is a simplified block diagram illustrating a computer system that can be used in accordance with an embodiment of the present disclosure.

FIG. 35 is a simplified block diagram illustrating a computer system 3500 that can be used in accordance with an embodiment of the present disclosure. In various embodiments, computer system 3500 may be used to implement any of the computers 3402, 3404, 3406, 3408, and 3410 described with respect to system environment 3400 above. As shown, computer system 3500 can include hardware elements that are electrically coupled via a bus 3524. The hardware elements can include one or more central processing units (CPUs) 3502, one or more input devices 3504 (e.g., a mouse, a keyboard, etc.), and one or more output devices 3506 (e.g., a display device, a printer, etc.). Computer system 3500 can also include one or more storage devices 3508. By way of example, the storage device(s) 3508 can include devices such as disk drives, optical storage devices, and solid-state storage devices such as a random access memory (RAM) and/or a read-only memory (ROM), which can be programmable, flash-updateable and/or the like.

Computer system 3500 can additionally include a computer-readable storage media reader 3512, a communications subsystem 3514 (e.g., a modem, a network card (wireless or wired), an infra-red communication device, etc.), and working memory 3518, which can include RAM and ROM devices as described above. In some embodiments, computer system 3500 can also include a processing acceleration unit 3516, which can include a digital signal processor (DSP), a special-purpose processor, and/or the like.

Computer-readable storage media reader 3512 can further be connected to a computer-readable storage medium 3510, together (and, optionally, in combination with storage device (s) 3508) comprehensively representing remote, local, fixed, and/or removable storage devices plus storage media for temporarily and/or more permanently containing computer-readable information. Communications system 3514 can permit data to be exchanged with network 3412 and/or any other computer described above with respect to system environment 3400.

Computer system 3500 can also comprise software elements, shown as being currently located within working memory 3518, including an operating system 3520 and/or other code 3522, such as an application program (which may be a client application, Web browser, mid-tier application, RDBMS, etc.). It should be appreciated that alternative embodiments of computer system 3500 can have numerous variations from that described above. For example, customized hardware can be used and particular elements can be implemented in hardware, software, or both. Further, connection to other computing devices such as network input/output devices can be employed.

Storage media and computer readable media for containing code, or portions of code, can include any appropriate media known or used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a computer.

Although specific embodiments of the disclosure have been described above, various modifications, alterations, alternative constructions, and equivalents are within the scope of the disclosure. For example, AIA is not restricted to use in a specific SOA environment, and can be used to develop and deploy SOA applications to any SOA infrastructure. Further, although embodiments of the present disclosure have been described with respect to certain flow diagrams and steps, it should be apparent to those skilled in the art that the scope of the present disclosure is mot limited to the described flow diagrams and steps.

Yet further, although embodiments of the present disclosure have been described using a particular combination of hardware and software, it should be recognized that other combinations of hardware and software are also within the scope of the present disclosure.

The specification and drawings are, accordingly, to be regarded in a illustrative rather than restrictive sense. It will be evident that additions, subtractions, and other modifications may be made thereunto without departing from the broader spirit and scope of the disclosure as set forth in the following claims.

For the Examiner's convenience, Applicants note that this application is a continuation of U.S. application Ser. No. 12/769,016 and claims the benefit of U.S. Application No. 61/290,850. The claims of the present application are different and possibly, at least in some aspects, broader in scope than the claims pursued in the parent application. To the extent any prior amendments or characterizations of the scope of any claim of the parent or any cited documents could be construed as a disclaimer of any subject matter supported by the present disclosure, Applicants hereby rescind and retract such disclaimer. Accordingly, the references previously presented in the parent applications may need to be revisited.

What is claimed is:

1. A computer-implemented method, comprising:

accessing, by a computer system, a functional description of one or more software services to be deployed as part of a Service Oriented Architecture (SOA) application, the functional description describing a proposed functionality of the one or more software services and including a set of business tasks for implementing the proposed functionality;

determining, by the computer system and without user selection, a service type for the one or more software services based at least in part on the functional description;

selecting a particular template for the service type from a plurality of templates based at least in part on the service type, the particular template identifying information to be collected regarding the one or more software services;

enabling, by the computer system, implementation of the one or more software services based at least in part on the information that is received via the particular template;

receiving, via a user interface, a selection of a software service from the one or more software services to be deployed as part of the SOA application;

collecting metadata pertaining to the selected software service;

generating the deployment plan based at least in part on the selected software service and the metadata pertaining to the selected software service;

retrieving a deployment properties file; and deploying, by the computer system, the SOA application based at least in part on the deployment plan and the deployment properties file.

2. The method of claim 1, further comprising retrieving the deployment properties file that specifies one or more target servers for deploying the selected software service, the deployment properties file including the information received via the particular template.

3. The method of claim 1, further comprising:
displaying a user interface to a user based at least in part on the particular template;
receiving service-related information entered into the user interface by the user; and
generating a code skeleton for the service based at least in part on the functional description and the received service-related information.

4. The method of claim 1, wherein the collecting, generating, and deploying are performed during different lifecycle phases of the SOA application.

5. The method of claim 1, further comprising:
receiving, from a user, one or more customizations to the deployment plan; and
modifying the deployment plan based at least in part on the one or more customizations prior to deploying the SOA application.

6. The method of claim 5, wherein the deployment plan is expressed in Extensible Markup Language (XML), and wherein the one or more customizations include one or more custom XML tags.

7. The method of claim 5, wherein the one or more customizations include one or more pre-deployment or post-deployment actions.

8. The method of claim 1, wherein the deployment plan further specifies one or more artifacts associated with the selected software service.

9. The method of claim 1, wherein the deployment plan further specifies one or more configurations associated with the selected software service.

10. The method of claim 1, wherein the one or more target servers include a target application server and a target database server.

11. The method of claim 1, wherein the metadata comprises deployment information associated with the selected software service and deployment information associated with one or more components utilized by the selected software service.

12. A non-transitory computer-readable storage medium having stored thereon program code executable by a computer system, the program code comprising:
code that causes the computer system to access a functional description of one or more software services to be deployed as part of a Service Oriented Architecture (SOA) application, the functional description describing a proposed functionality of the one or more software services and including a set of business tasks for implementing the proposed functionality;
code that causes the computer system to determine, independent of user selection, a service type for the one or more software services based at least in part on the functional description;
code that causes the computer system to select a particular template for the service type from a plurality of templates based at least in part on the service type, the particular template identifying information to be collected regarding the one or more software services;
code that causes the computer system to enable implementation of the one or more software services based at least in part on the information that is received via the particular template;
code that causes the computer system to receive, via a user interface, a selection of a software service from the one or more software services to be deployed as part of the SOA application;
code that causes the computer system to collect metadata pertaining to the selected software service;
code that causes the computer system to generate the deployment plan based at least in part on the selected software service and the metadata pertaining to the selected software service;
code that causes the computer system to retrieve a deployment properties file; and
code that causes the computer system to deploy the SOA application based at least in part on the deployment plan and the deployment properties file.

13. The non-transitory computer-readable storage medium of claim 12, wherein the collecting, generating, and deploying are performed during different lifecycle phases of the SOA application.

14. The non-transitory computer-readable storage medium of claim 12, wherein the program code further comprises:
code that causes the computer system to receive, from a user, one or more customizations to the deployment plan; and
code that causes the computer system to modify the deployment plan based at least in part on the one or more customizations prior to deploying the SOA application.

15. A system comprising:
a memory that stores computer-executable instructions; and
a processor configured to access the memory, wherein the processor is further configured to execute the computer-executable instructions to collectively at least:
access a functional description of one or more software services to be deployed as part of a Service Oriented Architecture (SOA) application, the functional description describing a proposed functionality of the one or more software services and including a set of business tasks for implementing the proposed functionality;
determine, independent of user selection, a service type for the one or more software services based at least in part on the functional description;
select a particular template for the service type from a plurality of templates based at least in part on the service type, the particular template identifying information to be collected regarding the one or more software services;
enable implementation of the one or more software services based at least in part on the information that is received via the particular template;
receive, via a user interface, a selection of a software service from the one or more software services to be deployed as part of the SOA application;
collect metadata pertaining to the selected software service;
generate the deployment plan based at least in part on the selected software service and the metadata pertaining to the selected software service;
retrieve a deployment properties file; and deploy the SOA application based at least in part on the deployment plan and the deployment properties file.

16. The system of claim 15, wherein the collecting, generating, and deploying are performed during different lifecycle phases of the SOA application.

17. The system of claim 15, wherein the processing component is further configured to:
  receive, from a user, one or more customizations to the deployment plan; and
  modify the deployment plan based at least in part on the one or more customizations prior to deploying the SOA application.

* * * * *